US010063924B2

(12) United States Patent
Joseph et al.

(10) Patent No.: US 10,063,924 B2
(45) Date of Patent: Aug. 28, 2018

(54) METHOD AND SYSTEM FOR TRANSFERRING USER SETTINGS TO ANOTHER USER RECEIVING DEVICE USING A MOBILE USER DEVICE

(71) Applicant: The DIRECTV Group, Inc., El Segundo, CA (US)

(72) Inventors: Kuriacose Joseph, Gaithersburg, MD (US); Scott D. Casavant, Germantown, MD (US); Sean S. Lee, Potomac, MD (US); Phillip T. Wang, Rockville, MD (US); Christopher Yang, Temple City, CA (US); Woei-Shyang Yee, Irvine, CA (US); Wesley W. Huie, Riverside, CA (US); Gerard V. Talatinian, Foothill Ranch, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 160 days.

(21) Appl. No.: 14/207,345

(22) Filed: Mar. 12, 2014

(65) Prior Publication Data

US 2014/0282807 A1    Sep. 18, 2014

Related U.S. Application Data

(60) Provisional application No. 61/786,864, filed on Mar. 15, 2013.

(51) Int. Cl.
*G06F 3/00* (2006.01)
*G06F 13/00* (2006.01)
(Continued)

(52) U.S. Cl.
CPC ..... *H04N 21/4516* (2013.01); *H04L 65/4076* (2013.01); *H04L 65/4084* (2013.01);
(Continued)

(58) Field of Classification Search
CPC ............ H04N 21/4516; H04N 21/4532; H04L 67/303; H04L 67/306
See application file for complete search history.

(56) References Cited

U.S. PATENT DOCUMENTS 6,493,688 B1 * 12/2002 Das et al. ........................ 706/20
6,658,415 B1 * 12/2003 Brown ................ G06F 21/6218
(Continued)

FOREIGN PATENT DOCUMENTS

WO    2012/011967 A1    1/2012

OTHER PUBLICATIONS

International Search Report and Written Opinion dated Aug. 26, 2014 in International Application No. PCT/US2014/024635 filed Mar. 12, 2014 by Pankaj Sharma et al.
(Continued)

*Primary Examiner* — Joshua D Taylor
(74) *Attorney, Agent, or Firm* — Harness, Dickey & Pierce, PLC

(57) ABSTRACT

A system and method for operating a user receiving device includes a first user device that receives first user settings and stores the first user settings therein. The first user device communicates first user settings to a second user receiving device. The second user receiving device operates with the first user settings.

16 Claims, 28 Drawing Sheets

(51) Int. Cl.
  *H04N 5/445* (2011.01)
  *H04N 21/45* (2011.01)
  *H04L 29/08* (2006.01)
  *H04L 29/06* (2006.01)
(52) U.S. Cl.
  CPC ............ *H04L 67/306* (2013.01); *H04L 67/34* (2013.01); *H04N 21/4532* (2013.01)

(56) References Cited

U.S. PATENT DOCUMENTS

| | | | |
|---|---|---|---|
| 8,325,673 | B1 | 12/2012 | McQuaide, Jr. |
| 9,106,307 | B2 | 8/2015 | Molettiere |
| 2003/0110502 | A1* | 6/2003 | Creed et al. ............ 725/86 |
| 2003/0149988 | A1 | 8/2003 | Ellis |
| 2005/0251827 | A1 | 11/2005 | Ellis |
| 2007/0061835 | A1* | 3/2007 | Klein et al. ............ 725/25 |
| 2008/0148310 | A1 | 6/2008 | Strickland |
| 2008/0275974 | A1 | 11/2008 | Rackiewicz |
| 2009/0006583 | A1 | 1/2009 | Kindle et al. |
| 2009/0019131 | A1 | 1/2009 | Ganesan |
| 2009/0059090 | A1* | 3/2009 | Fan et al. ............ 348/734 |
| 2010/0005483 | A1 | 1/2010 | Rao |
| 2010/0162294 | A1 | 6/2010 | Yin et al. |
| 2010/0211636 | A1 | 8/2010 | Starkenburg |
| 2010/0242071 | A1 | 9/2010 | Hwang et al. |
| 2011/0237324 | A1* | 9/2011 | Clavin et al. ............ 463/29 |
| 2011/0283333 | A1 | 11/2011 | Ukkadam |
| 2011/0321072 | A1* | 12/2011 | Patterson ......... H04N 21/44222 725/5 |
| 2012/0019400 | A1 | 1/2012 | Patel |
| 2012/0030554 | A1* | 2/2012 | Toya ............... 715/206 |
| 2012/0079512 | A1 | 3/2012 | Nambakkam et al. |
| 2012/0114313 | A1* | 5/2012 | Phillips ............ G11B 20/10527 386/298 |
| 2013/0024884 | A1 | 1/2013 | Agnihotri et al. |
| 2013/0051755 | A1 | 2/2013 | Brown et al. |
| 2013/0167170 | A1 | 6/2013 | Klappert et al. |
| 2013/0167196 | A1 | 6/2013 | Spencer et al. |
| 2014/0128025 | A1 | 5/2014 | Raleigh |
| 2014/0298414 | A1 | 10/2014 | Alsina et al. |

OTHER PUBLICATIONS

International Search Report and Written Opinion dated May 22, 2014 in International Application No. PCT/US2014/026657 filed Mar. 13, 2014 by Kuriacose Joseph et al.
International Search Report and Written Opinion dated Aug. 8, 2014 in International Application No. PCT/US2014/028880 filed Mar. 14, 2014 by Kuriacose Joseph et al.
APPLE TV®; Apple TV® (2nd and 3rd Generation): Understanding AirPlay® Settings; Nov. 12, 2014 (Effective date: Jan. 28, 2013 iOS® 6.1 release date); http://support.apple.com/en-us/HT202618.
Non-final Office action dated Feb. 5, 2015 in U.S. Appl. No. 14/207,354, filed Mar. 12, 2014 by Kuriacose Joseph et al.
Non-final Office action dated Jul. 20, 2015 in U.S. Appl. No. 14/207,354, filed Mar. 12, 2014 by Kuriacose Joseph et al.
Notice of Allowance dated Jan. 7, 2016 in U.S. Appl. No. 14/207,354, filed Mar. 12, 2014 by Kuriacose Joseph et al.
Non-final Office action dated Jun. 24, 2016 in U.S. Appl. No. 14/200,565, filed Mar. 7, 2014 by Pankaj Sharma et al.

* cited by examiner

FIG. 10

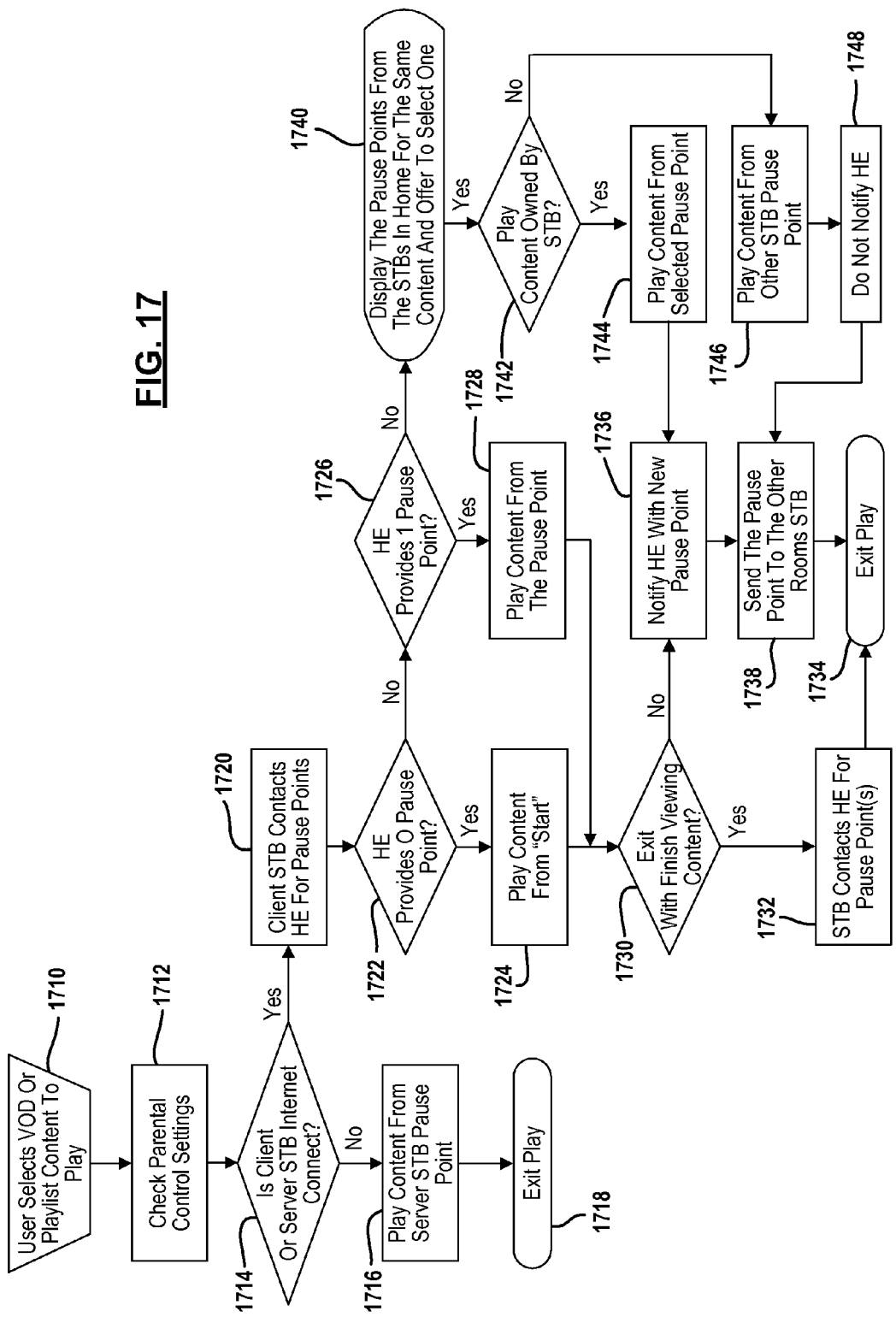

METHOD AND SYSTEM FOR TRANSFERRING USER SETTINGS TO ANOTHER USER RECEIVING DEVICE USING A MOBILE USER DEVICE

TECHNICAL FIELD

The present disclosure relates to a content communication system, and, more specifically, to operating user devices with user settings from another user receiving device using a mobile device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Electronic devices are increasingly accessing the other content distribution networks such as the Internet. Network connections provide additional means for providing content to customers.

Content may also be provided to a set top box on an individual basis for pay. For example, on-demand content may be provided to a set top box after ordering the content from the set top box. Other types of user devices may also have access or may be provided on-demand content. In a typical system, when content is ordered from a set top box, other user devices such as a mobile user device do not have access to the same content. This may be for many reasons including formatting issues. Customers of a home based content system often travel to hotels or desire mobile access to content. Further, in a home environment, content is typically restricted such as parental controls on a user device basis. Providing access to content at a customized level would provide greater flexibility and convenience to access the content.

SUMMARY

The present disclosure provides a method and system for transferring user settings from a first user device to another user device using a mobile device.

In one aspect of the disclosure, a method includes communicating first user settings from a first user receiving device to a first user device, storing first user settings in the first user device, communicating the first user settings from the first user device to a second user receiving device and operating the second user receiving device with the first user settings.

In another aspect of the disclosure, a system has a first user device that receives first user settings and stores the first user settings therein. The first user device communicates first user settings to a second user receiving device. The second user receiving device operates with the first user settings.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4A:
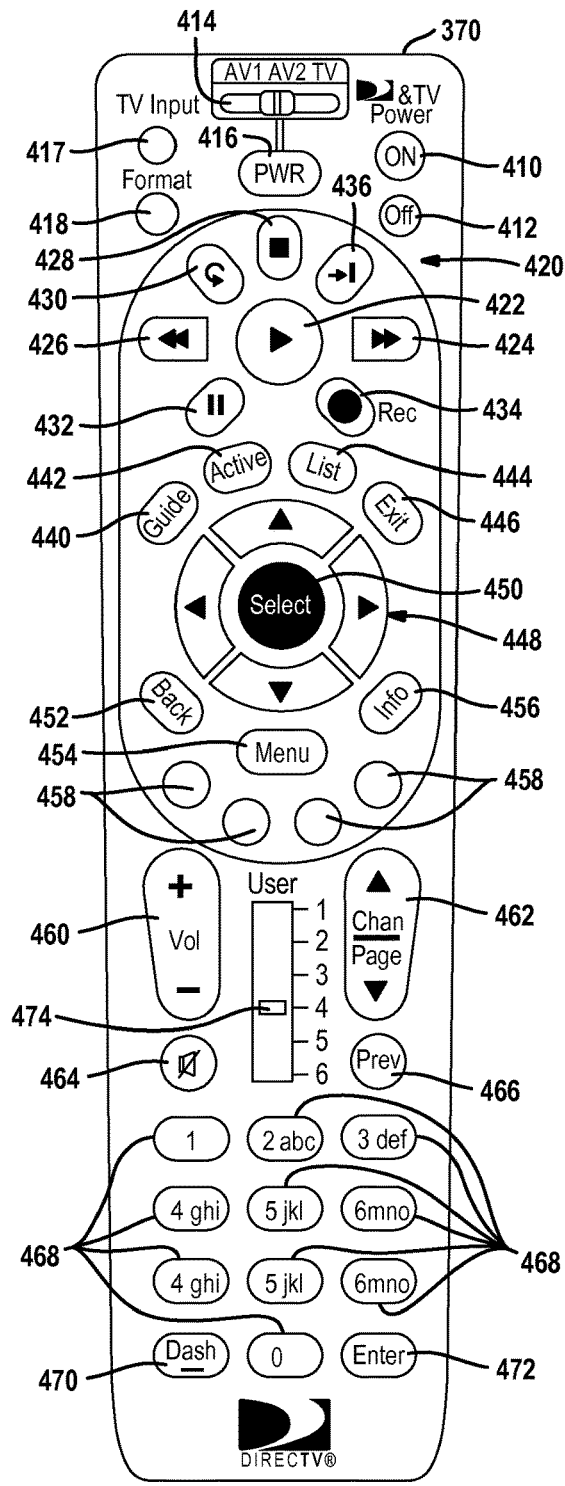

FIG. 4A plan view of a remote control device according to the present disclosure.

Figure 4B:
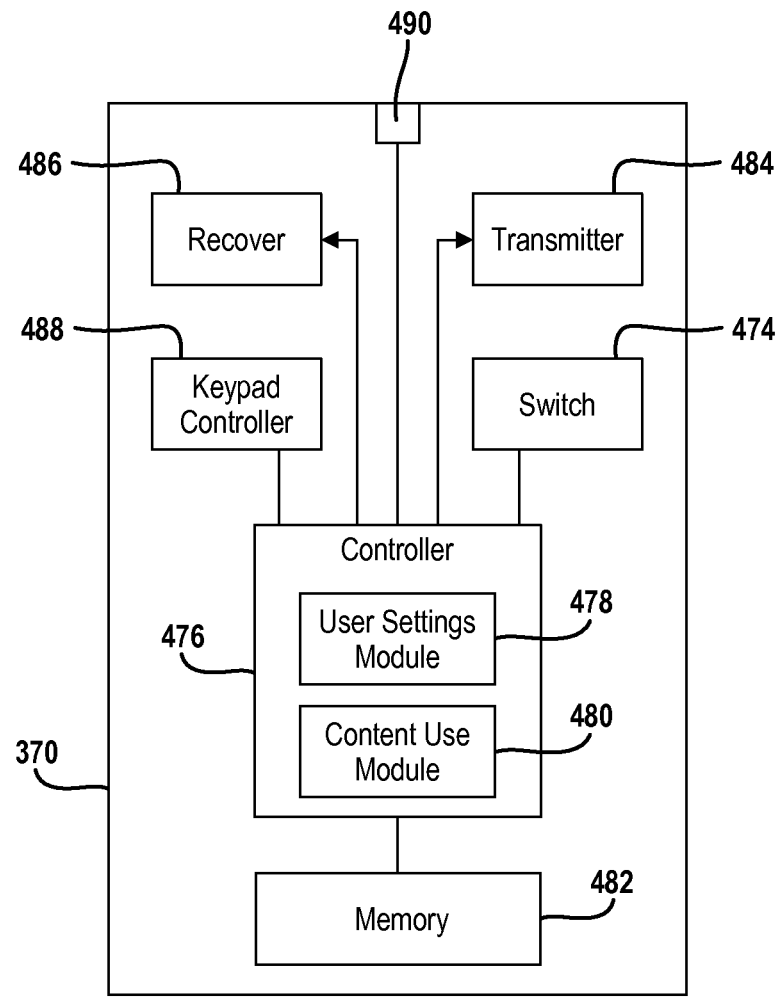

FIG. 4B is a simplified block diagrammatic view of the remote control of FIG. 4A.

Figure 5:
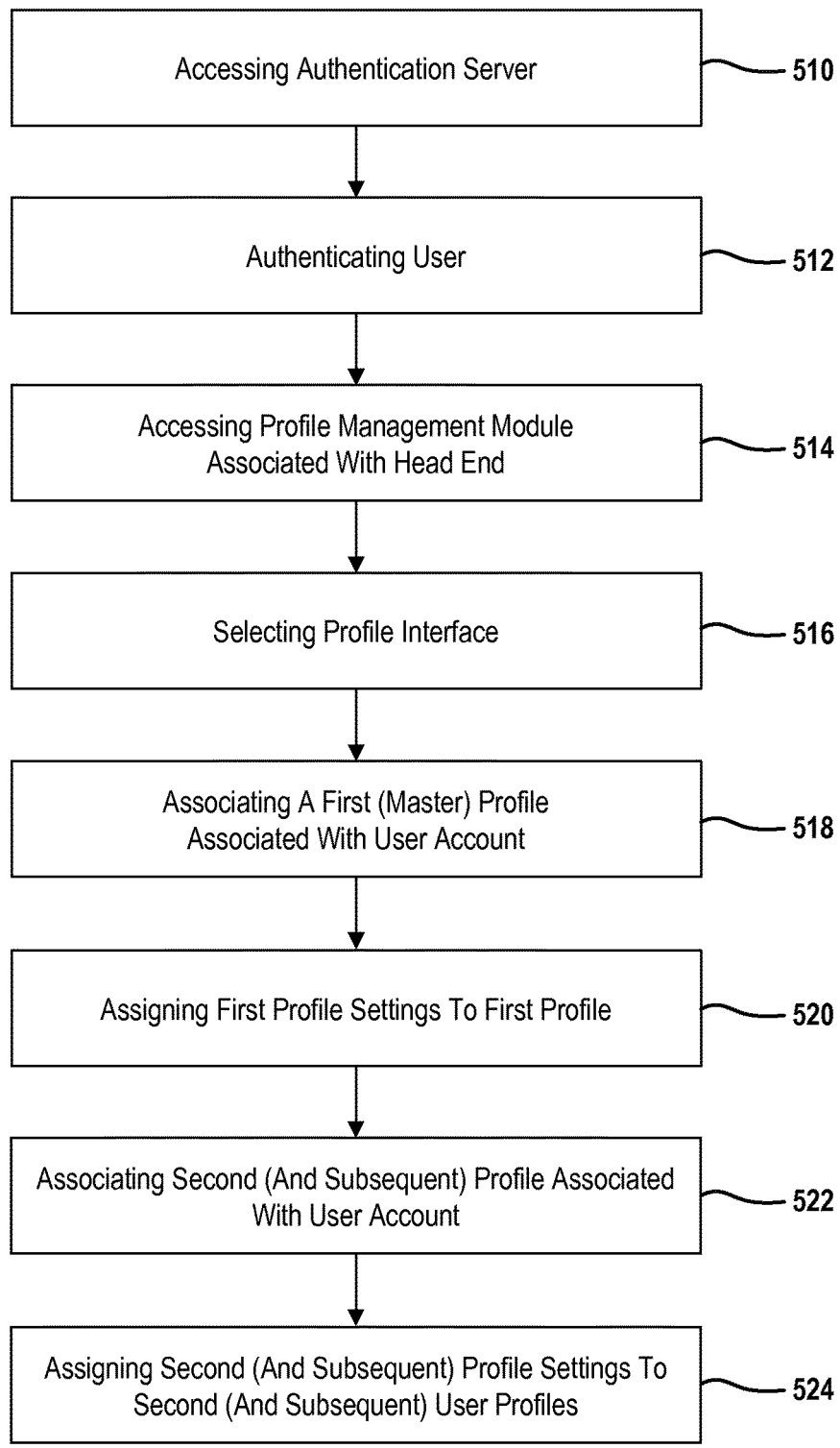

FIG. 5 is a flowchart of a method for assigning user settings to a profile.

Figure 6:
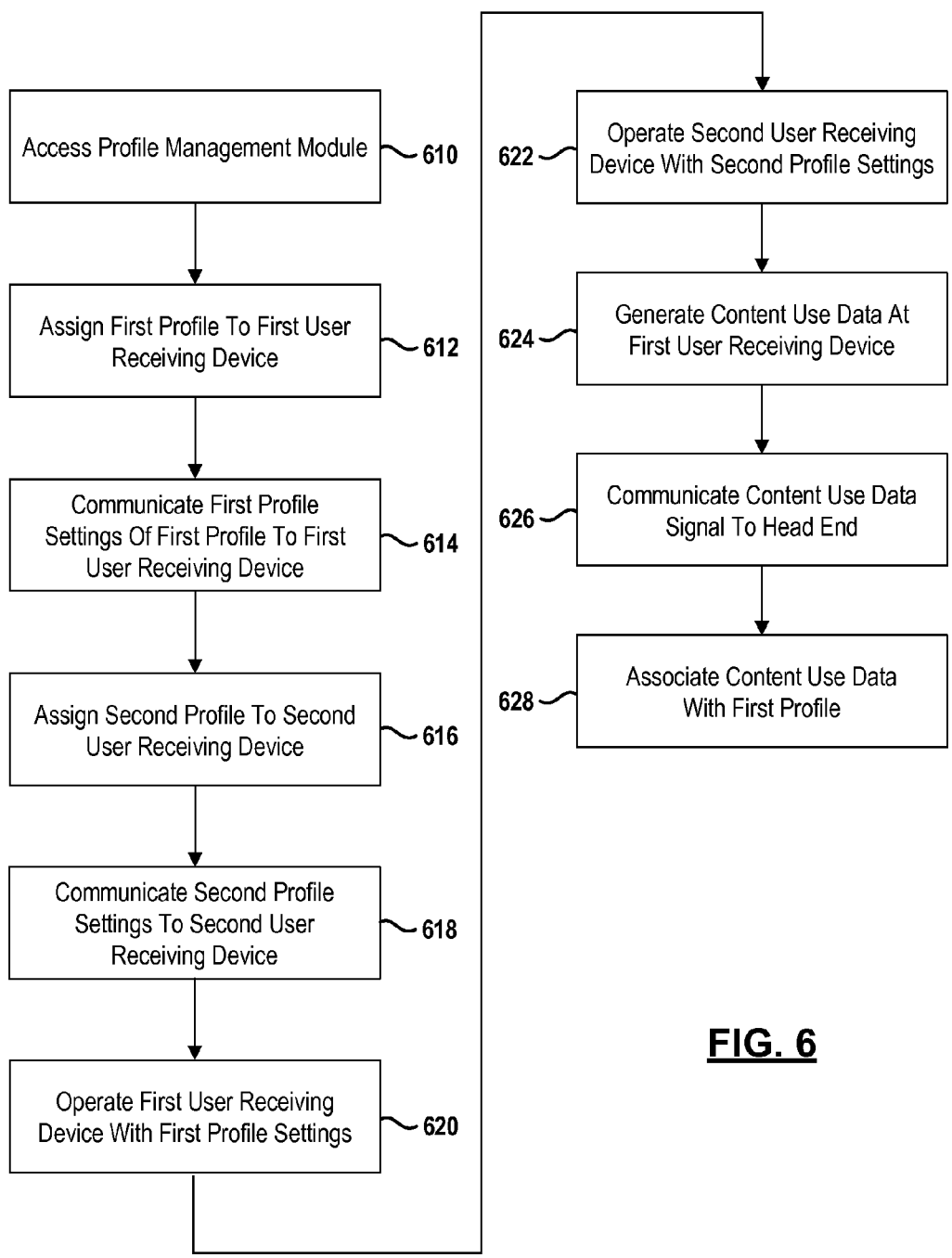

FIG. 6 is a flowchart of a method for operating a user receiving device with profile settings.

Figure 7:
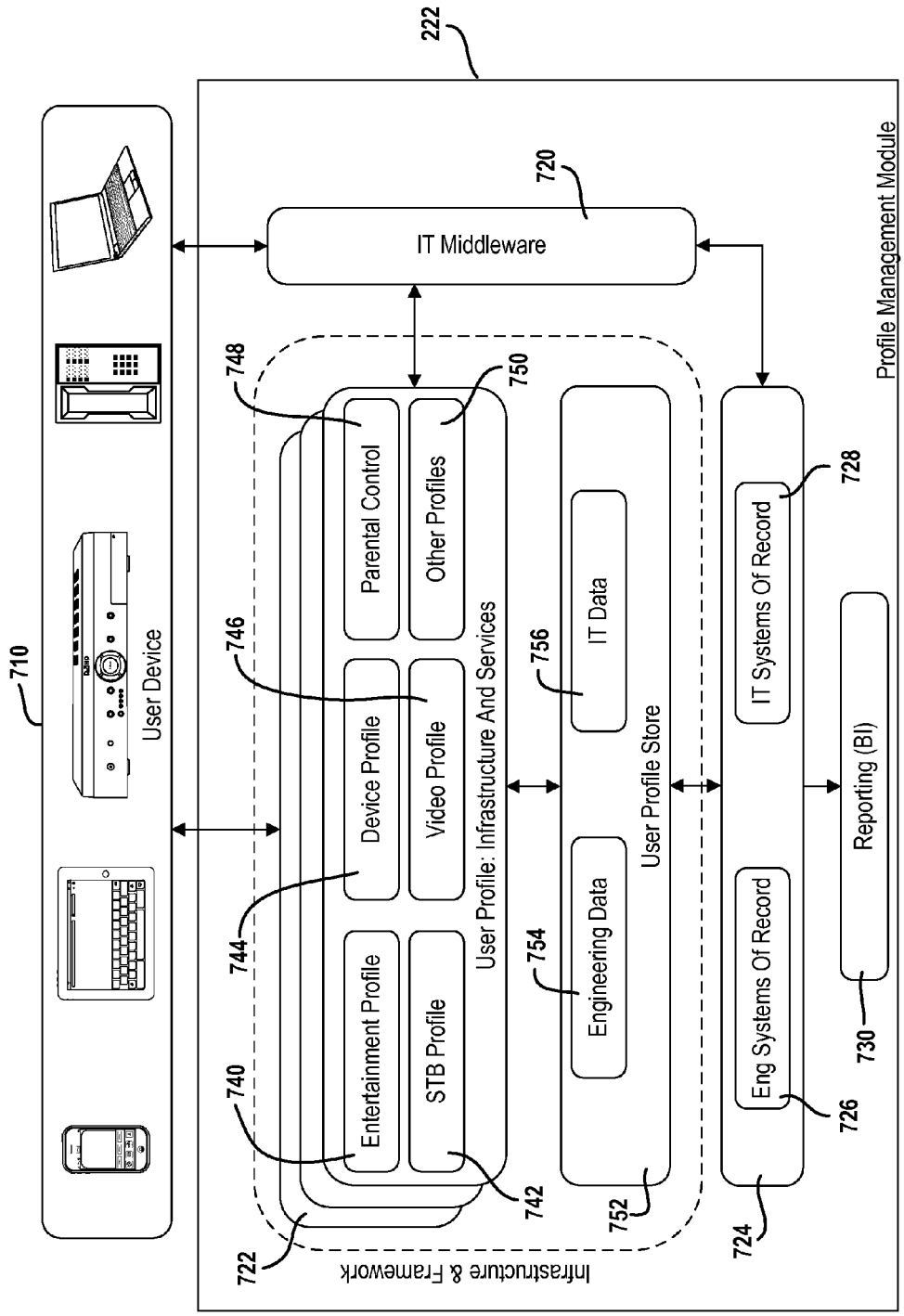

FIG. 7 is a block diagrammatic view of the profile management module.

Figure 8:
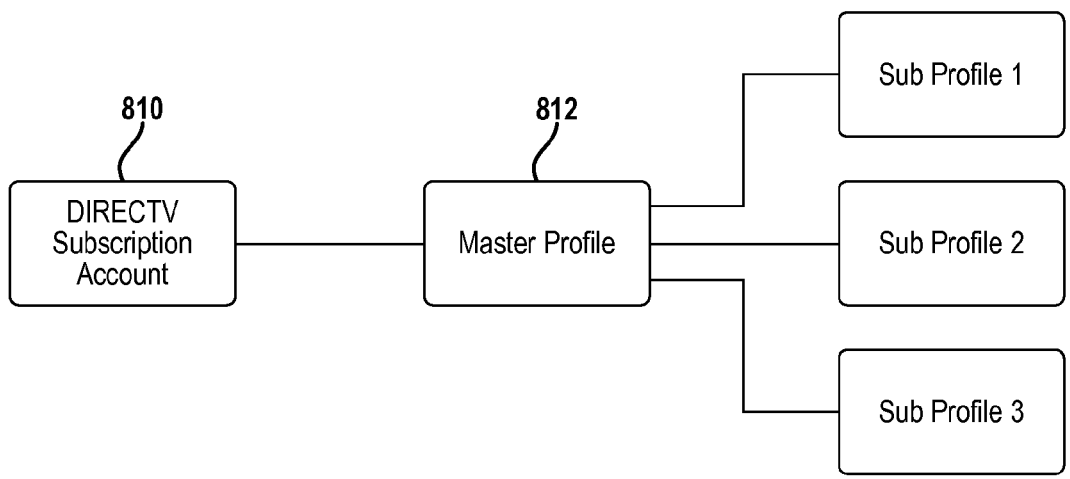

FIG. 8 is a high level block diagram of the data structure for profiles.

Figure 9:
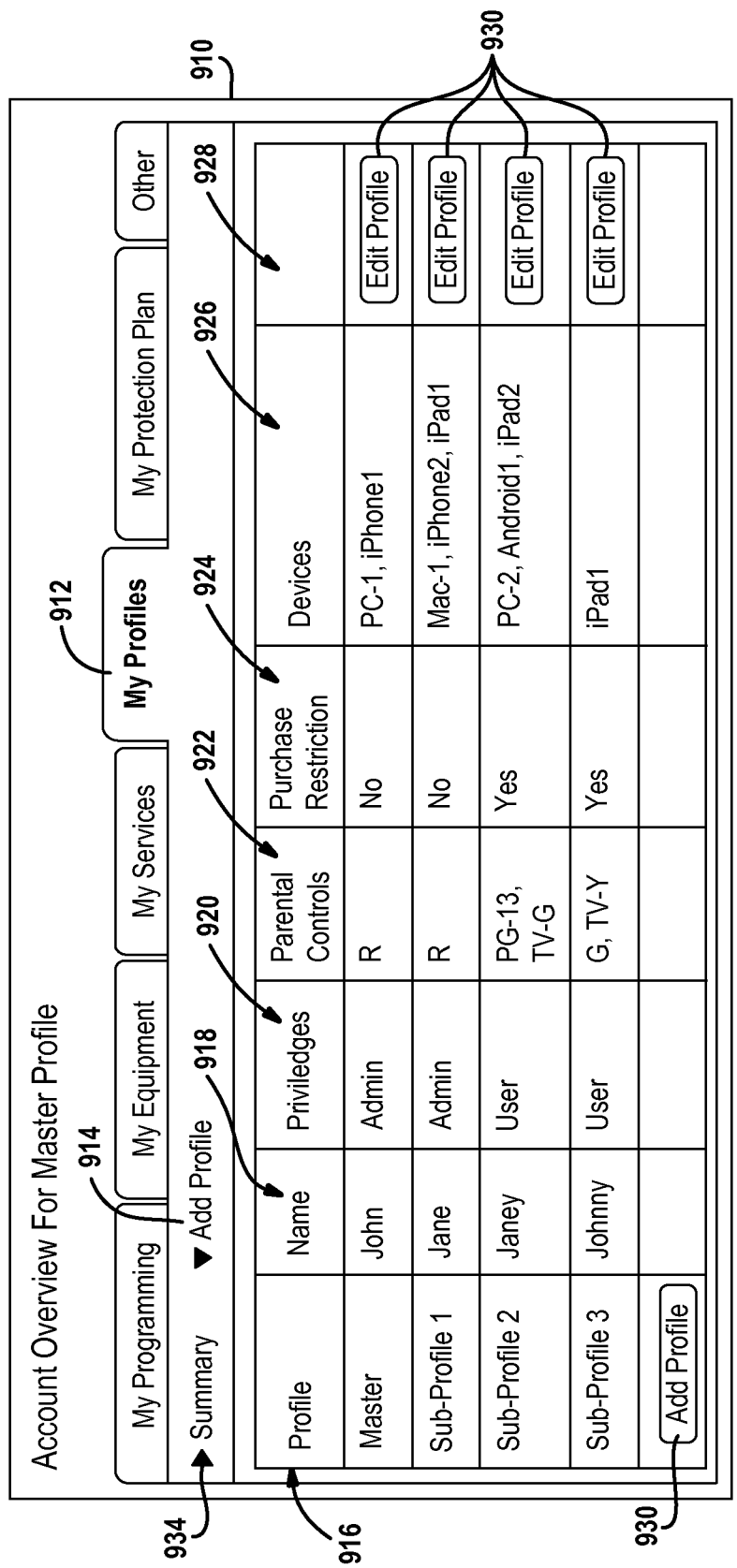

FIG. 9 is a screen view of a user interface for establishing profile settings.

Figure 10:
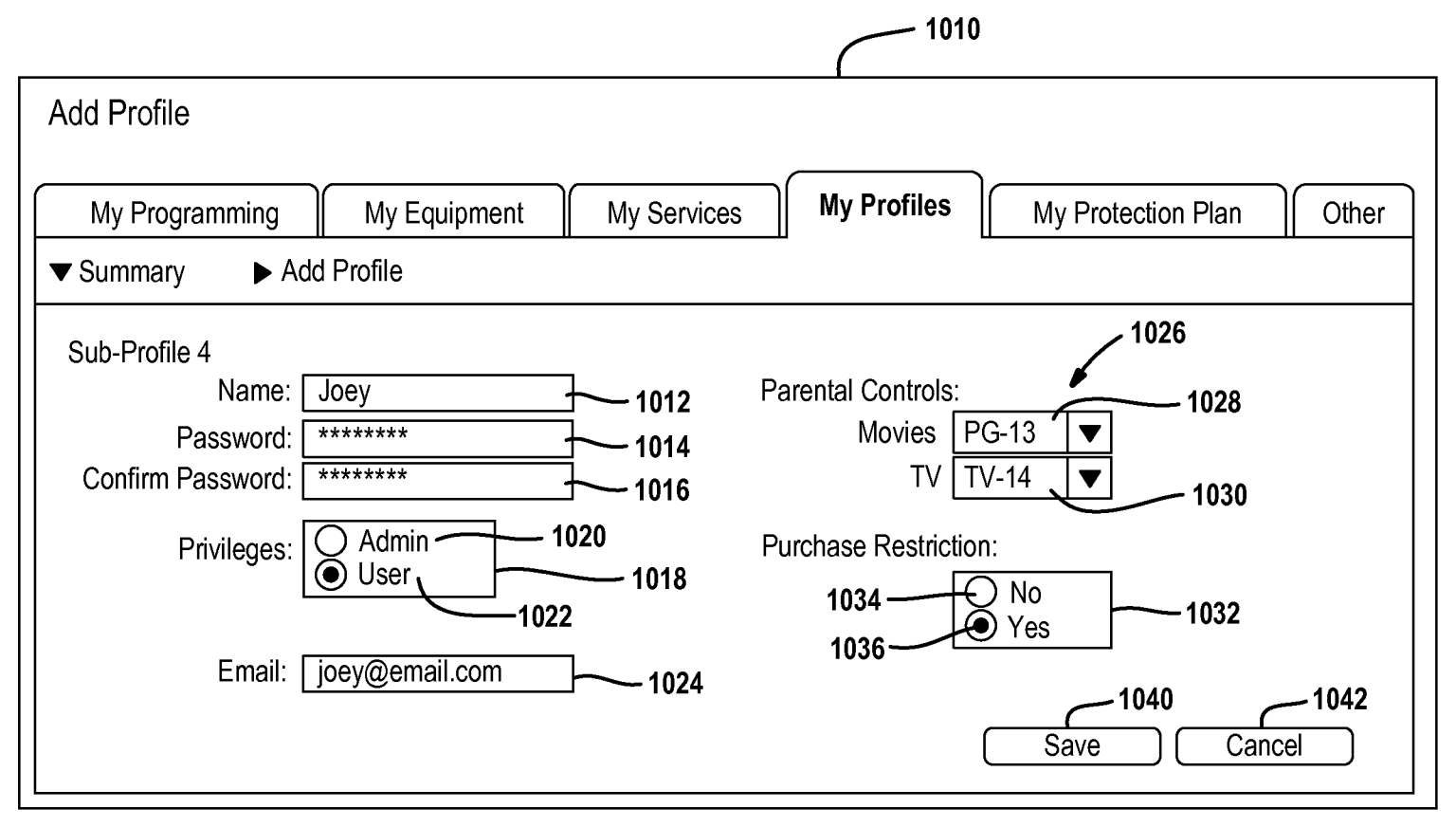

FIG. 10 is a screen view of a user interface for adding a profile.

Figure 11A:
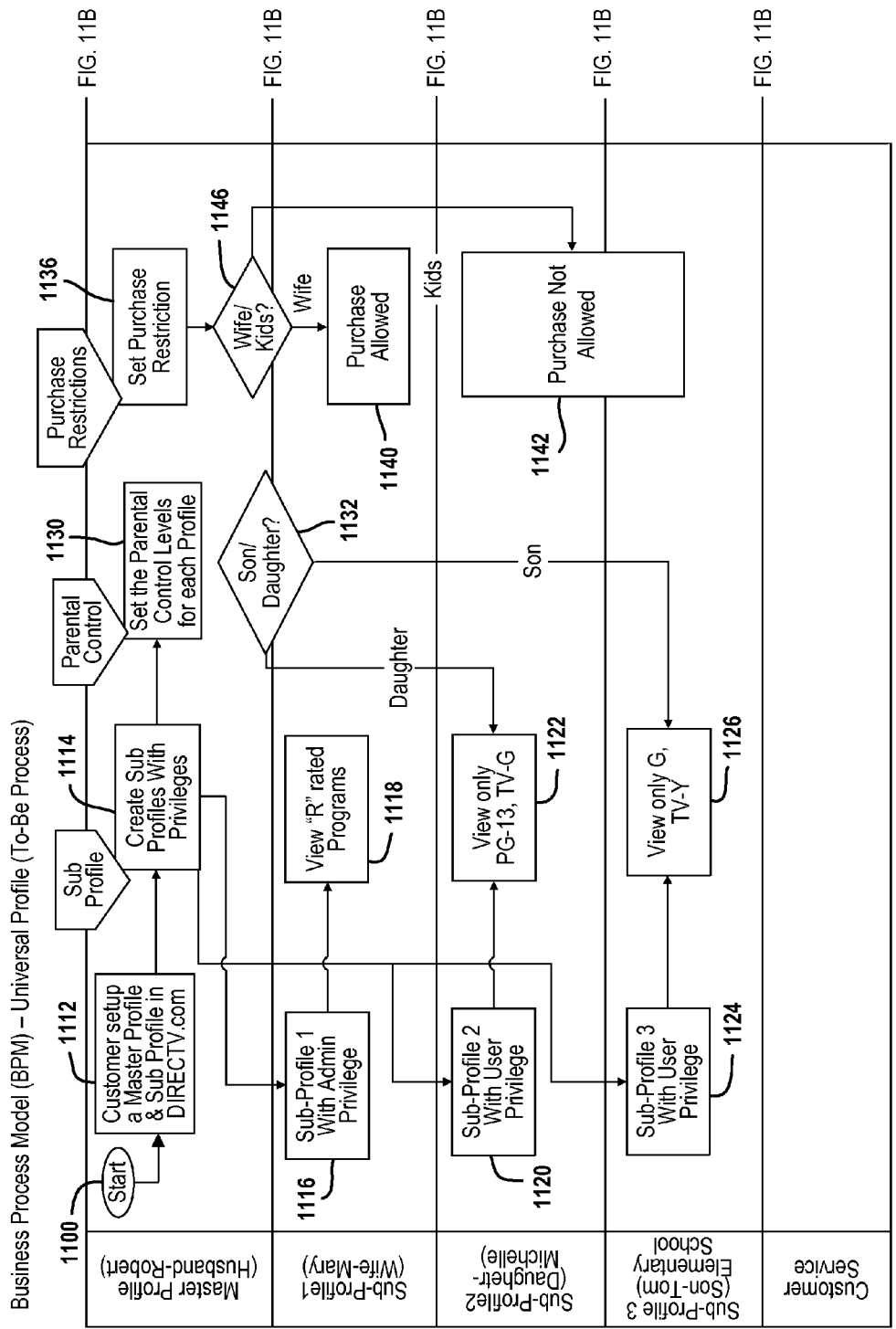
Figure 11B:
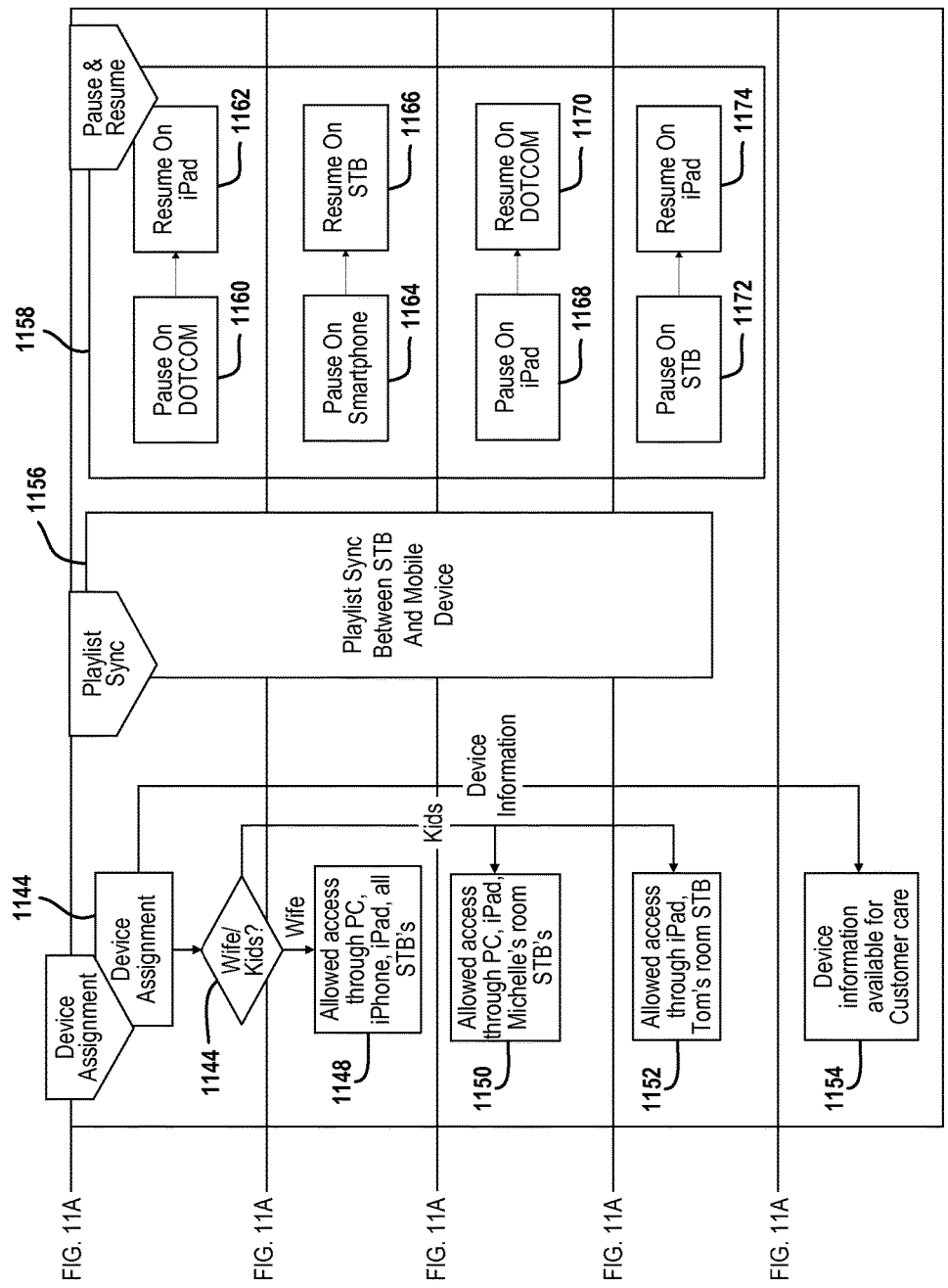

FIGS. 11A and 11B are a combined flowchart of an example of operating a system with multiple profiles.

Figure 12:
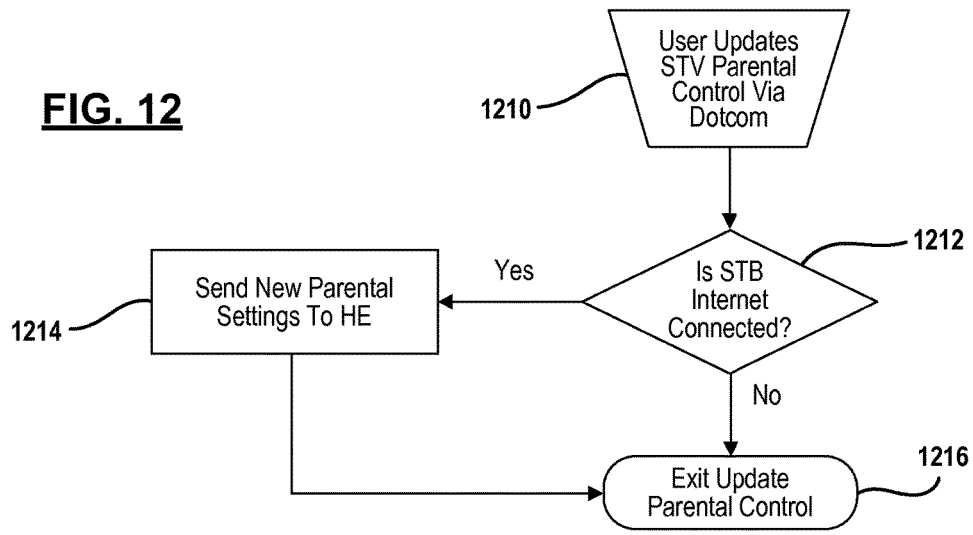

FIG. 12 is a flowchart is one method for updating parental controls.

Figure 13:
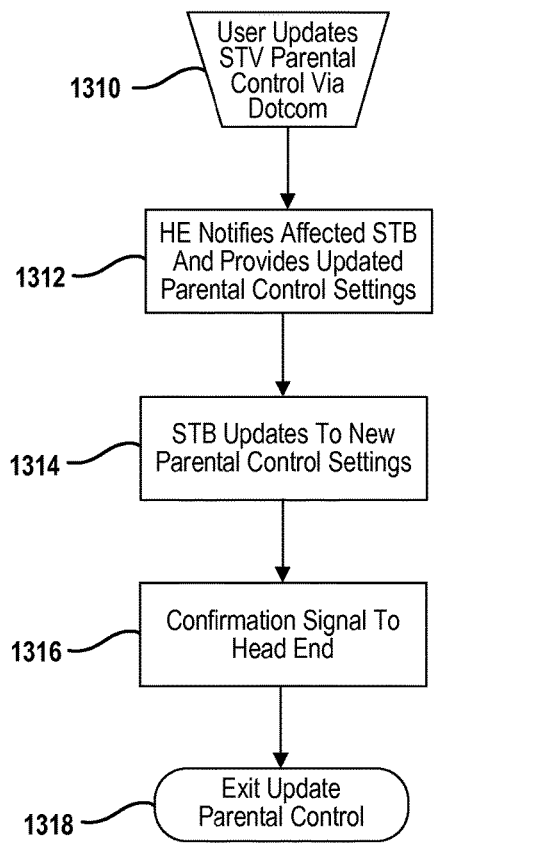

FIG. 13 is a flowchart of a second method for updating parental controls.

Figure 14:
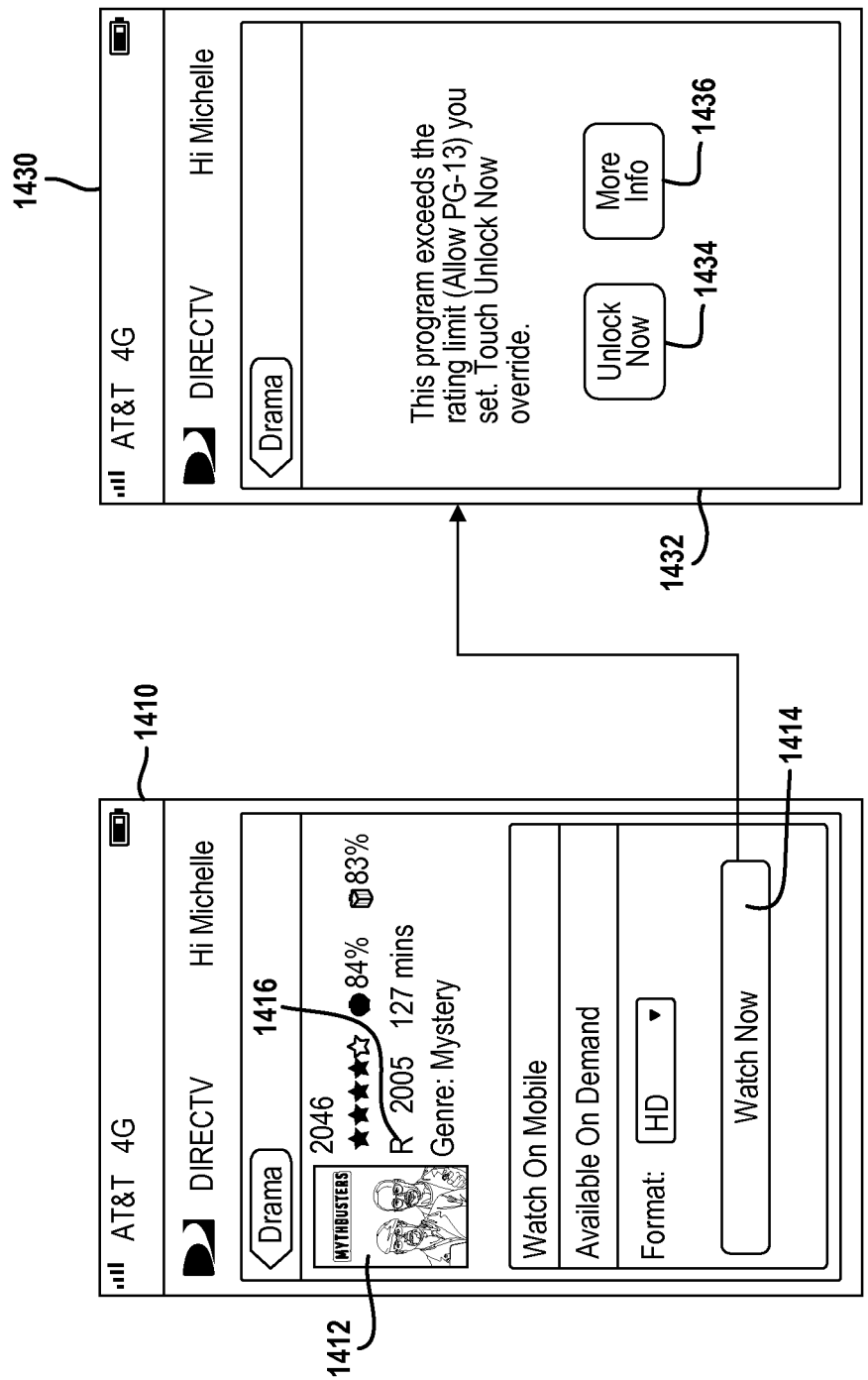

FIG. 14 shows two screen views of parental controls.

Figure 15:
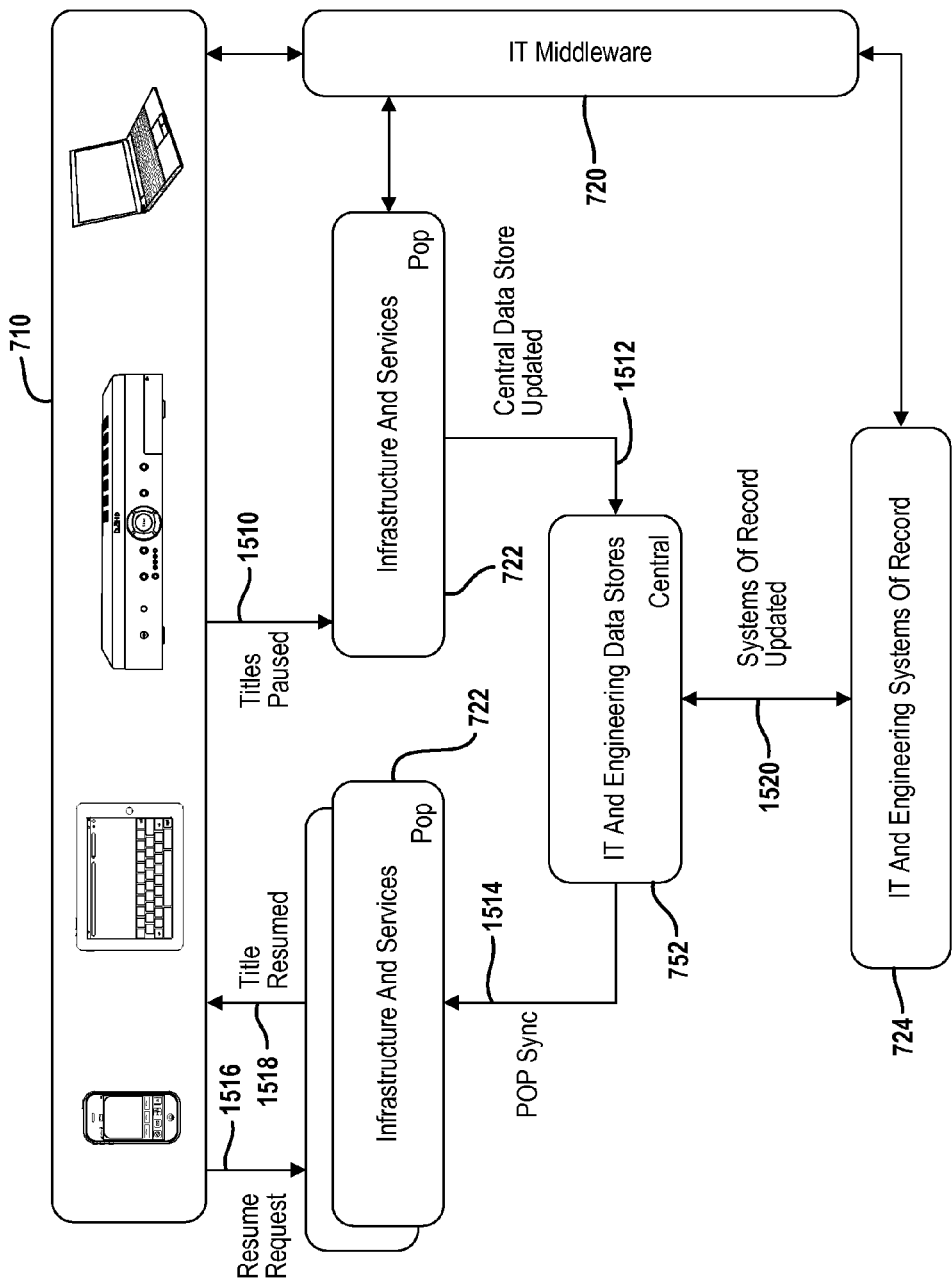

FIG. 15 is a state diagram for pausing and resuming video content.

Figure 16:
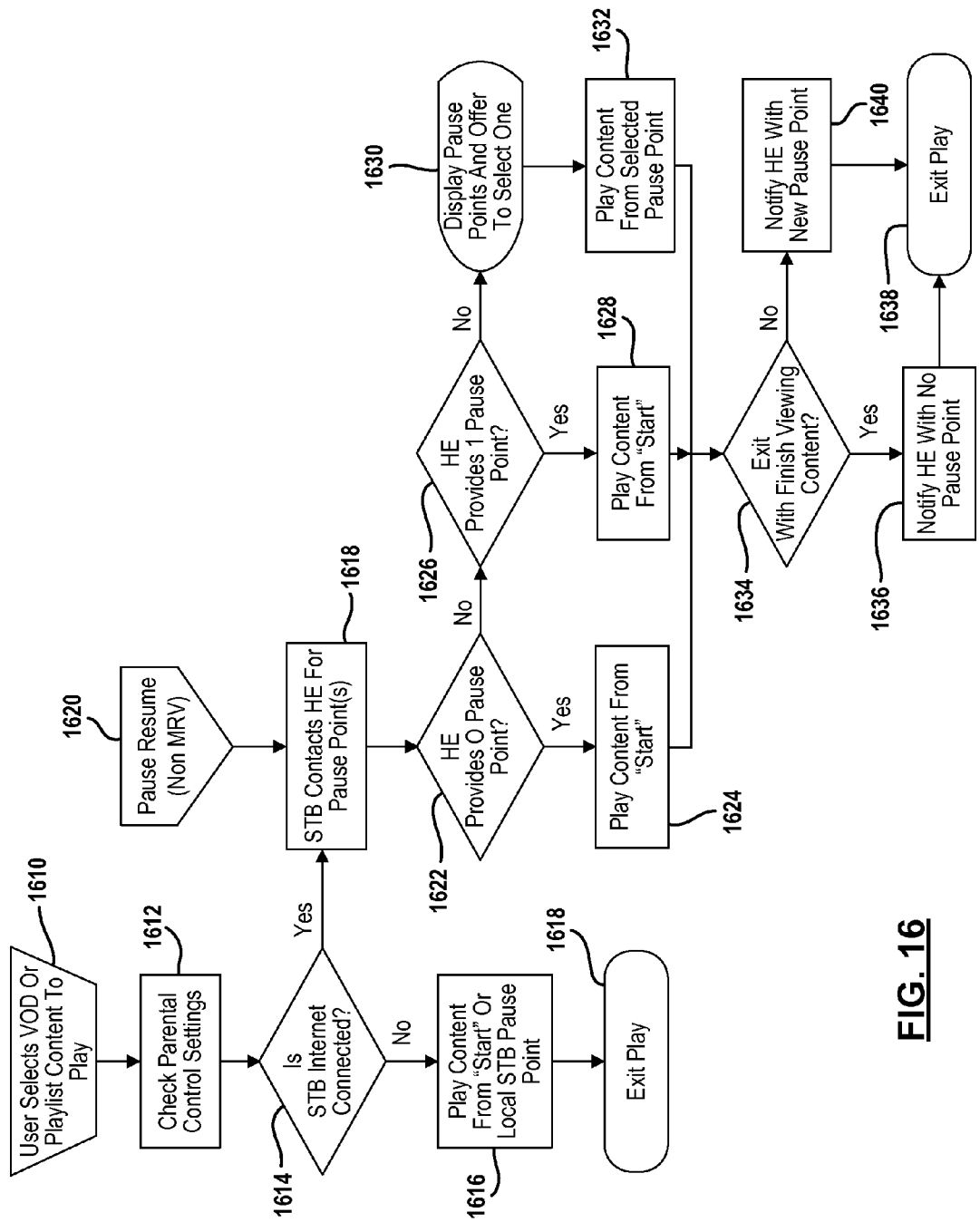

FIG. 16 is a flowchart of a method for pausing and resuming content in a non-multi-room system.

FIG. 17 is a flowchart of a method for pausing and resuming in a multi-room or central server system.

Figure 18A:
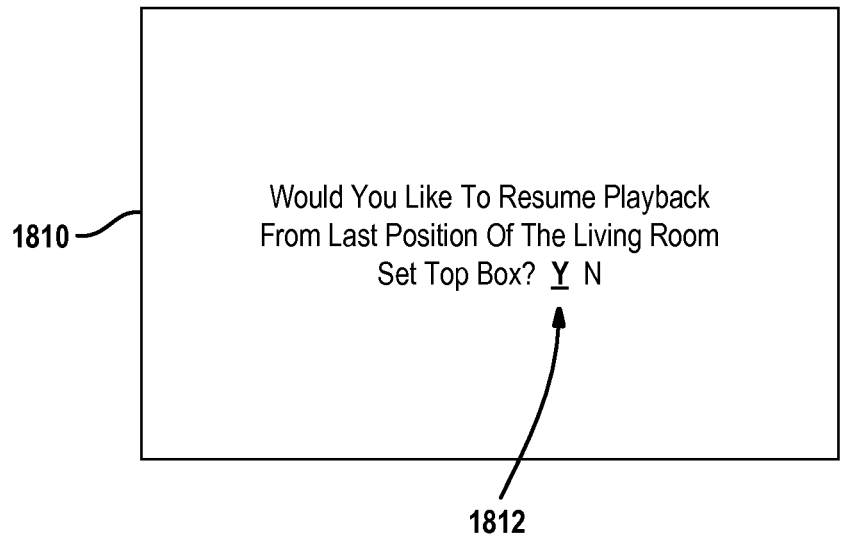

FIG. 18A is a screen display of a user interface for resuming playback.

Figure 18B:
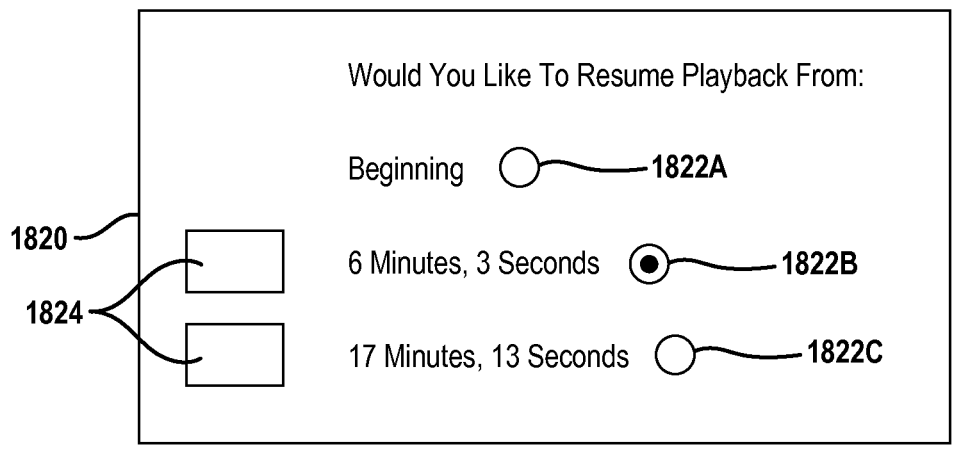

FIG. 18B is a second example of a screen display for resuming playback.

Figure 19:
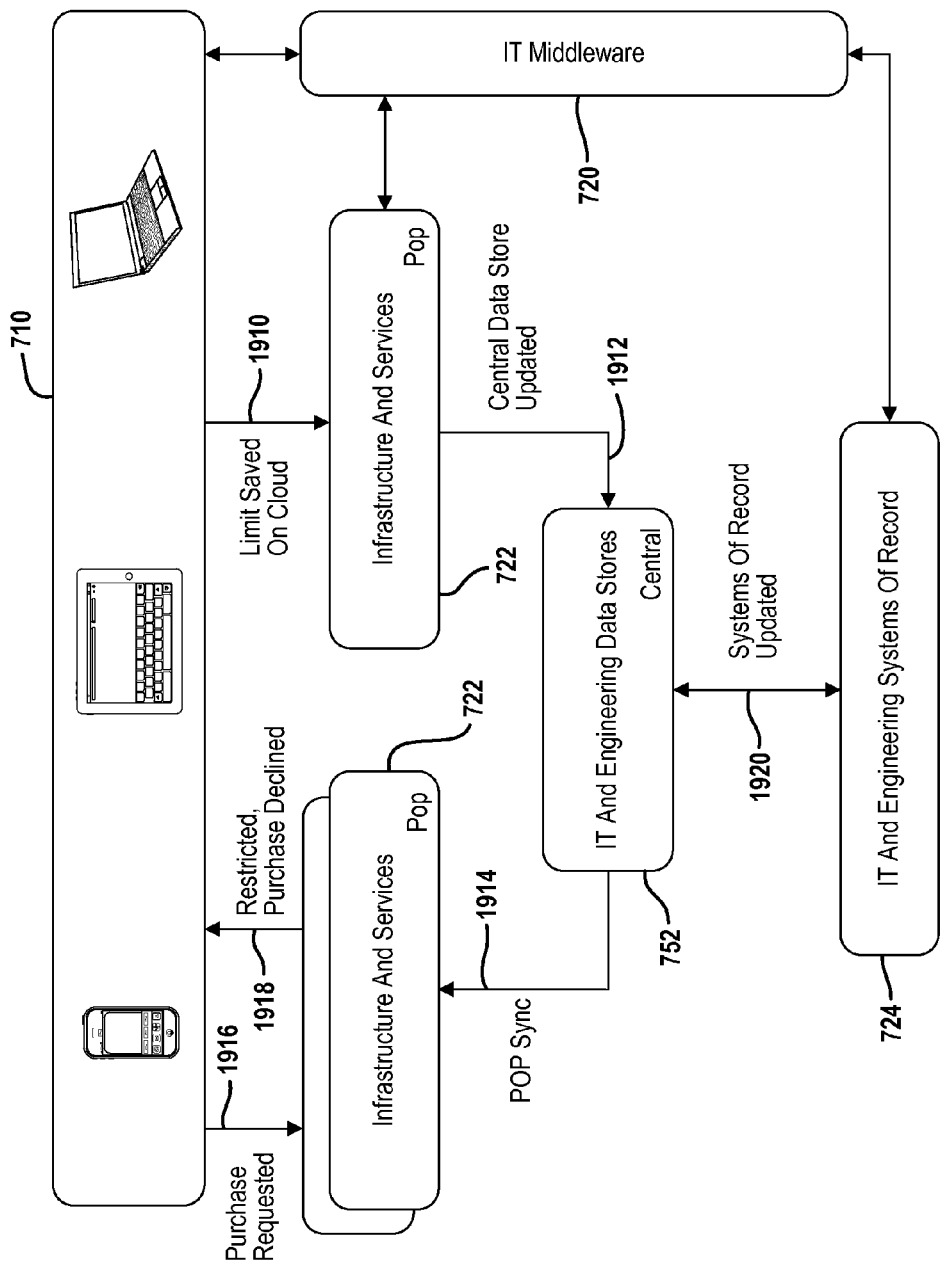

FIG. 19 is a state diagram for determining purchase restrictions.

Figure 20:
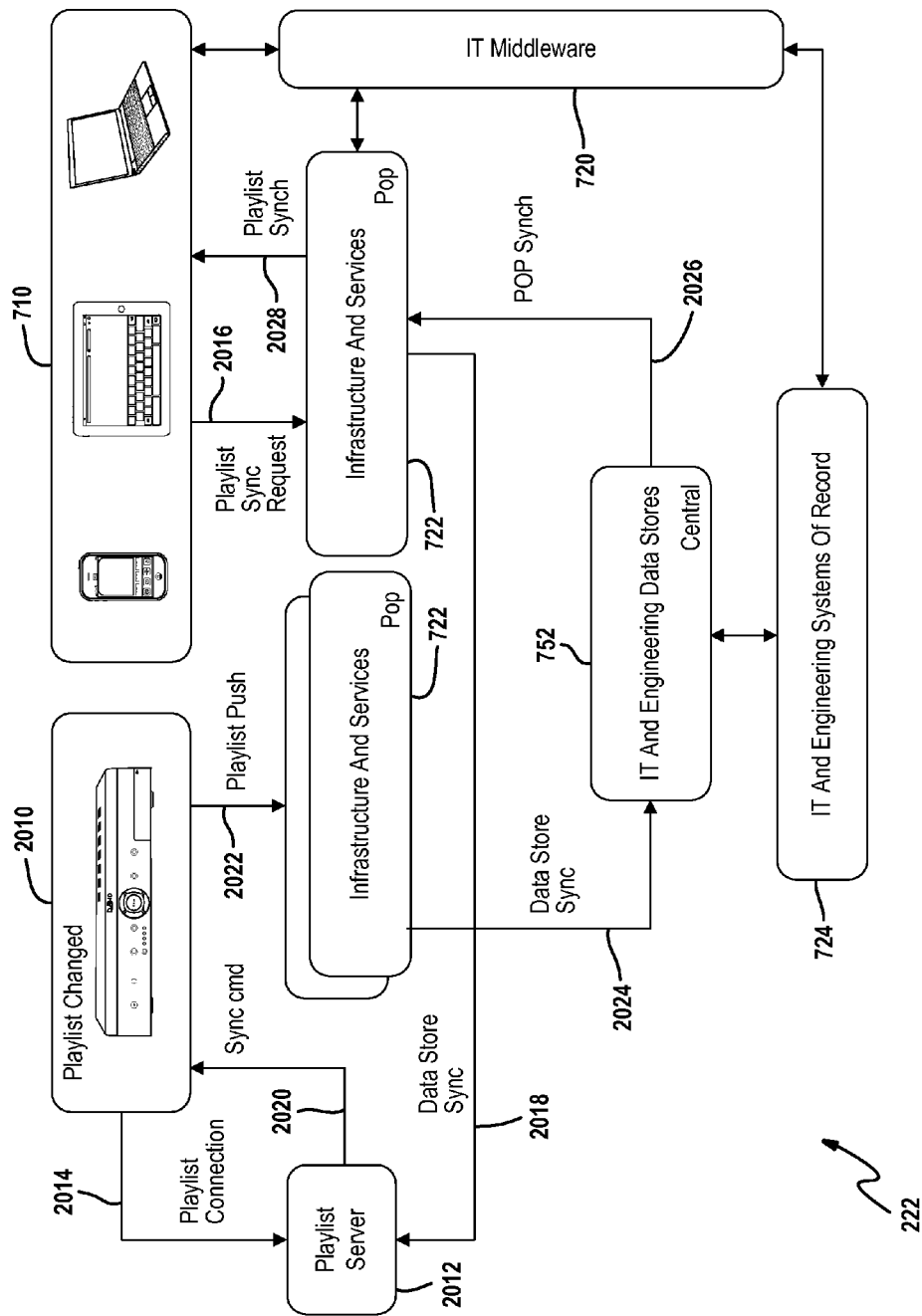

FIG. 20 is a screen display for transferring playlist settings to another user device.

Figure 21:
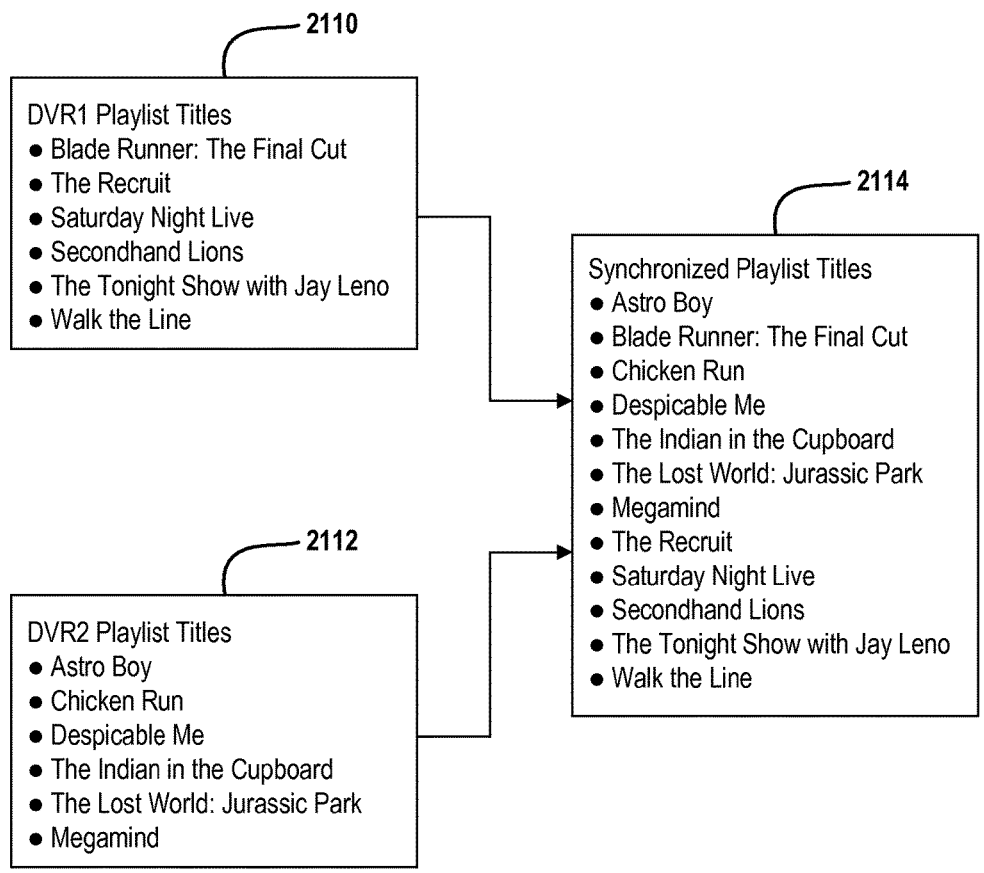

FIG. 21 is a screen display of merging playlists.

Figure 22:
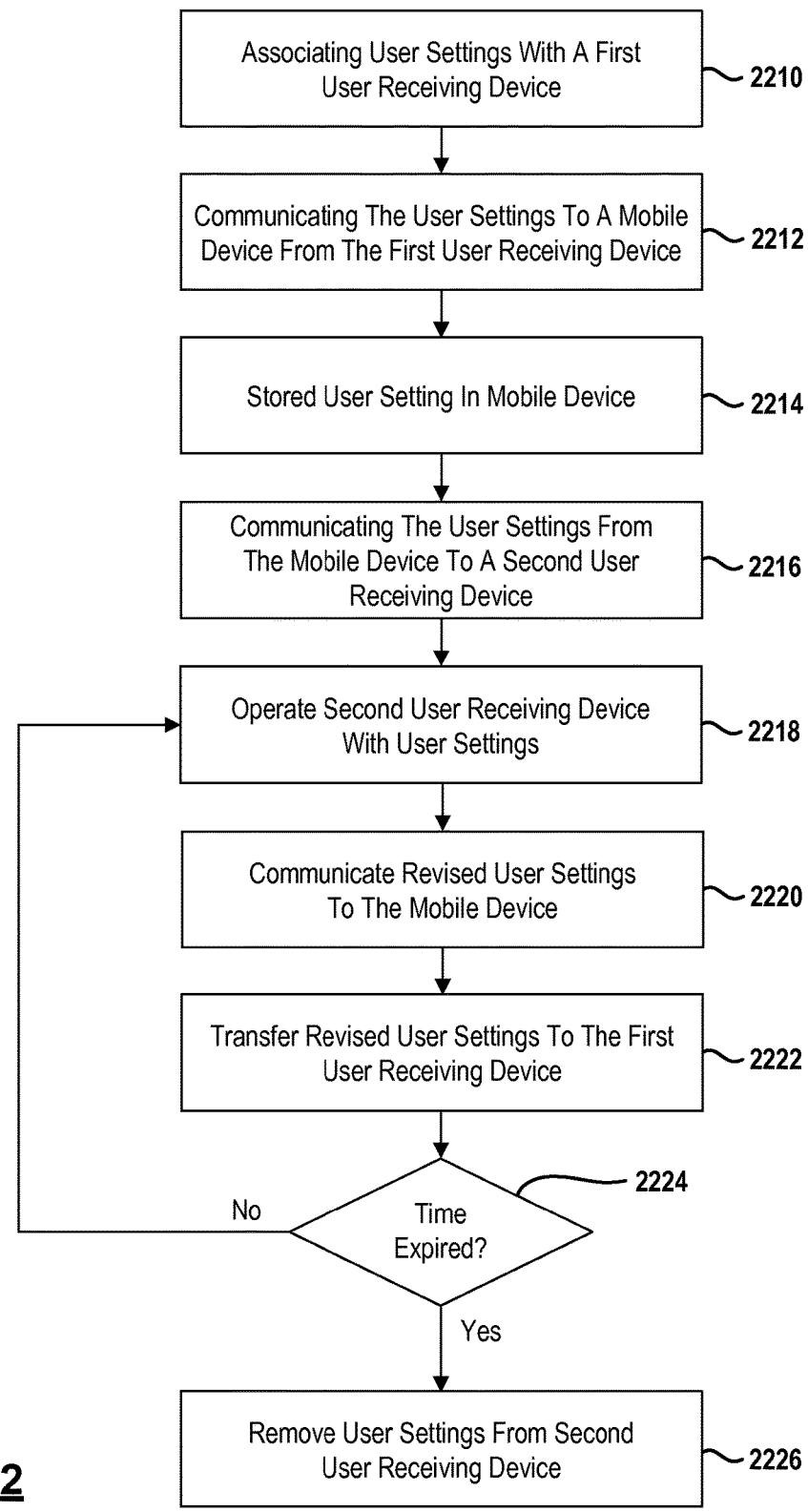

FIG. 22 is a flowchart of a method for operating a user device with user settings.

Figure 23:
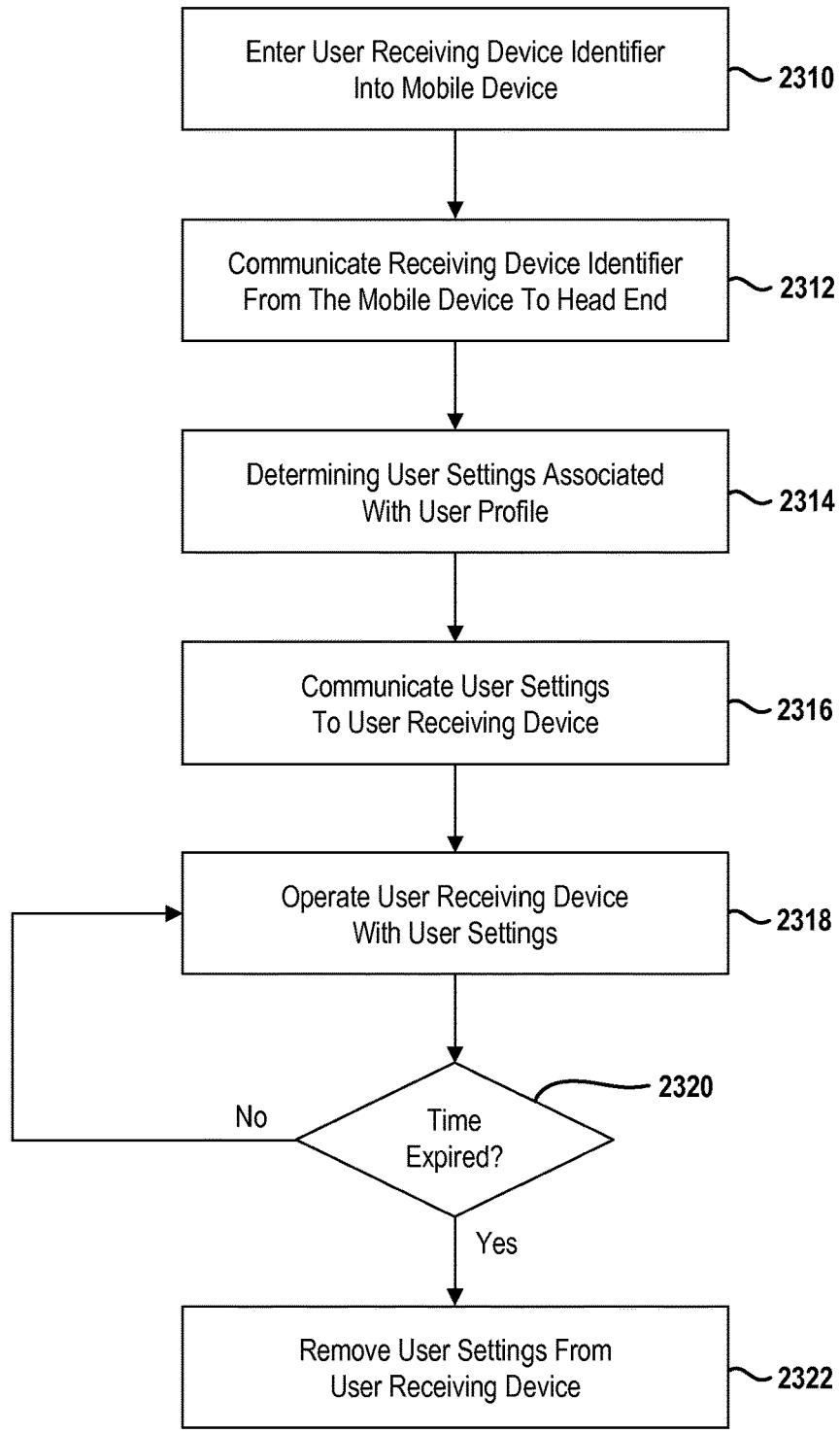

FIG. 23 is a flowchart of another example of communicating user settings to operate a user receiving device.

Figure 24:
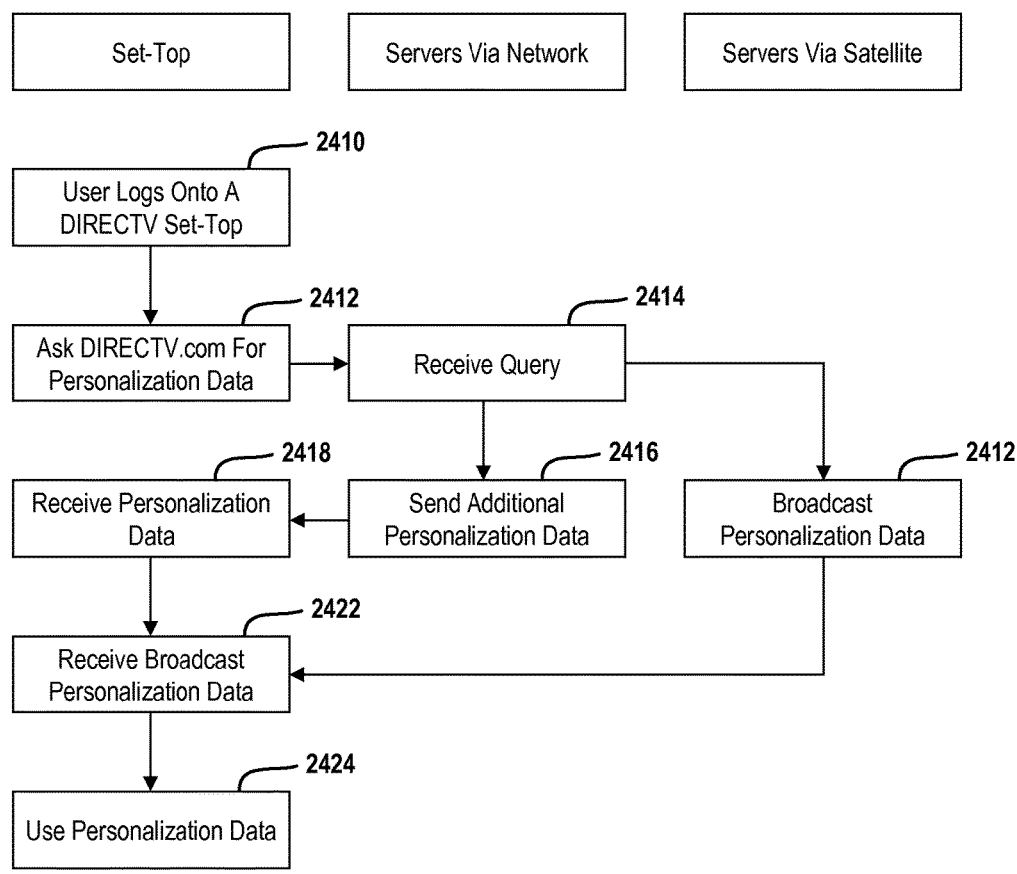

FIG. 24 is a flowchart of a method for operating a set top box using personalization data such as user settings.

Figure 25:
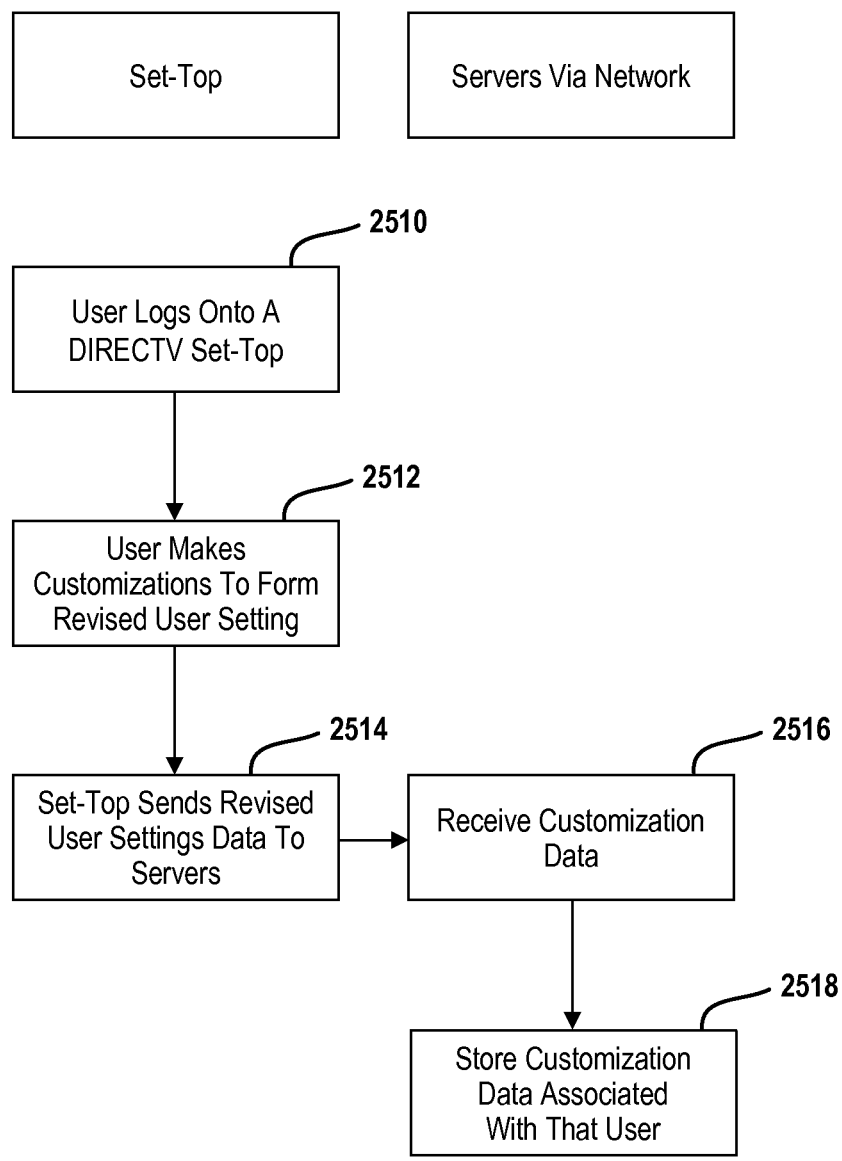

FIG. 25 is a flowchart of a method for communicating changed customizations from the set top box to a head end.

Figure 26:
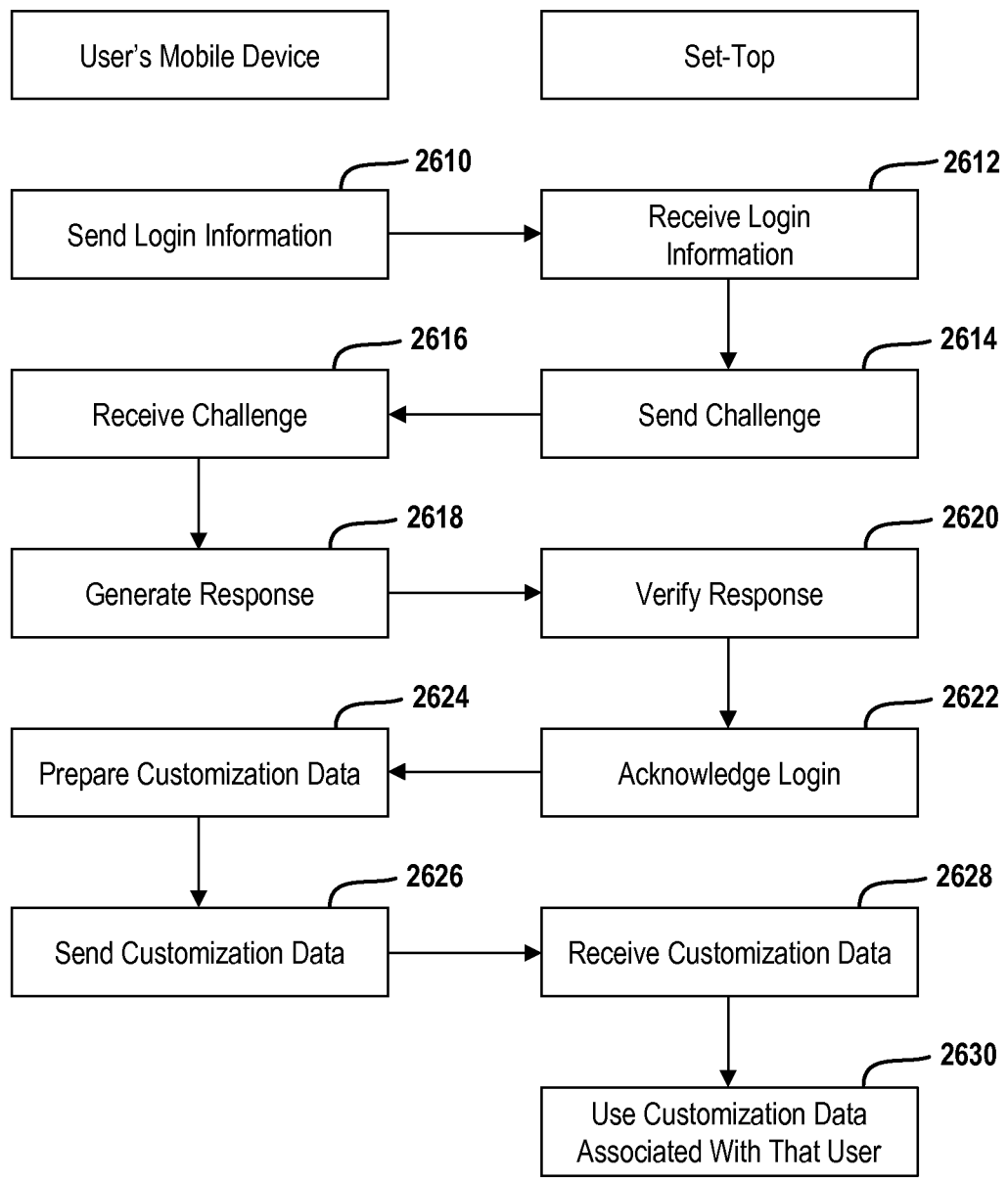

FIG. 26 is flow chart of a non-network set top box in communication with a mobile device.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

The following description provides a number of examples of systems that provide access to user settings, such as profile settings and content use data. The examples allow a user to have a similar viewer experience at other devices away from the typical set top box-based system.

Figure 1:
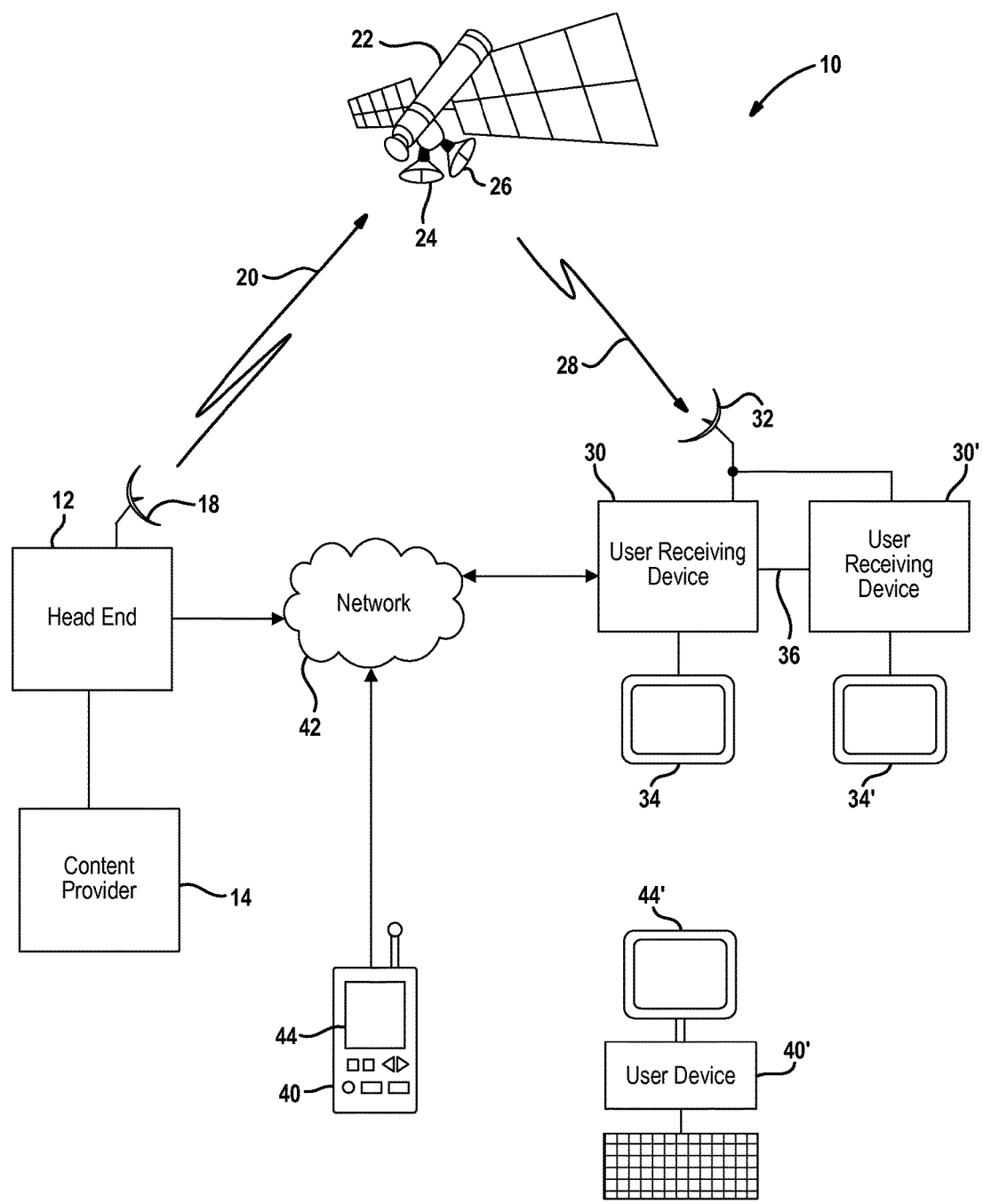
FIG. 1 is a block diagrammatic view of a content communication system according to the present disclosure.

Referring now to FIG. 1, a communication system 10 is illustrated. The communication system 10 includes a head end 12 that is used as a content processing system and a transmission source. The head end 12 may also be used for distributing content and providing billing data. The details of the head end 12 will be further described below in FIG. 2.

A plurality of content providers 14, only one of which is illustrated, may provide content and data related to the content such as metadata to the head end 12. The head end 12 receives various types of content and data from the content provider and communicates the content to various user devices associated with the system.

The head end 12 may communicate content to users in various manners including a satellite system and through terrestrial networks. Carrying through with the satellite example, the head end 12 includes an antenna 18 for communicating process content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

Two different types of user devices are illustrated. In this example, a first user receiving device 30 includes a receiving antenna 32. The user receiving device 30 has a display 34 associated therewith. The user receiving device 30 may be referred to as a fixed user device because the user device is intended to be operated from a fixed position on the surface of the earth. The user receiving device 30 may be referred as a set top box or set back box. A set back box may be used in a hotel environment where hiding the user device is desirable. The user receiving device 30 may include circuitry to tune, decode and store content therein. The user receiving devices 30 receive content broadcasted from the head end 12. Details of the user receiving device 30 are further described below.

The user receiving device 30 may be in communication with a second user receiving device 30' through a network 36 such as a local area network. The second user receiving device 30' may be associated with a display 34'. Content may reside in one or the other user receiving device 30, 30' and may be delivered to another in a multi-room viewing function.

Another type of user device includes a mobile network user device 40. The network user device 40 may not be capable of receiving signals broadcasted from the satellite 22. Rather, the network user device 40 may receive content through a network 42. The network 42 is a terrestrial network. The network user device 40 may include a display 44 for displaying content thereon. The network user device 40 may include various circuitry including a browser or other processing circuitry for receiving, decoding and processing the content so it may be displayed on the display 44. Details of the network user device 40 will be further described below. The network user device 40 may be referred to as mobile because it is portable in nature.

Another example of a network user receiving device 40' is a computer. The computer may also include a display 44' for displaying content thereon. The computer 40' may be a fixed (desktop) computer or a mobile (laptop) computer. The network user device 40 may be a mobile phone, personal digital assistant, or the like.

Several user network device devices 40 and user receiving devices 30 may be associated with a single account. The communication system 10 may include a plurality of users where each user is associated with an account. Each account may have several users thereunder. Each user may have their own profile with profile or user settings. Profile settings may include purchase restrictions, the ability to buy pay-per-view, to pay bills, and parental controls. Each profile may also have content use data associated therewith. The content use data may include a playlist, a "to-do" list of upcoming recordings and pause and resume position points for different content. The content use data may also include a viewing history list that has the pause and resume points for previously viewed or partially viewed content.

The network 42 may be a single network or a combination of different networks or different types of networks. For example, the network 42 may be a broadband wired network or wireless network. The network 42 may be a one-way network so that data may be communicated from the user receiving device 30 to the head end 12. The network 42 may also be used in a two-way capacity for delivering content from the head end 12 in response to selection signals communicated from the user receiving devices 30, 30', user devices 40 or 40'. The network 42 may be in communication with the local area network 36.

Figure 2:
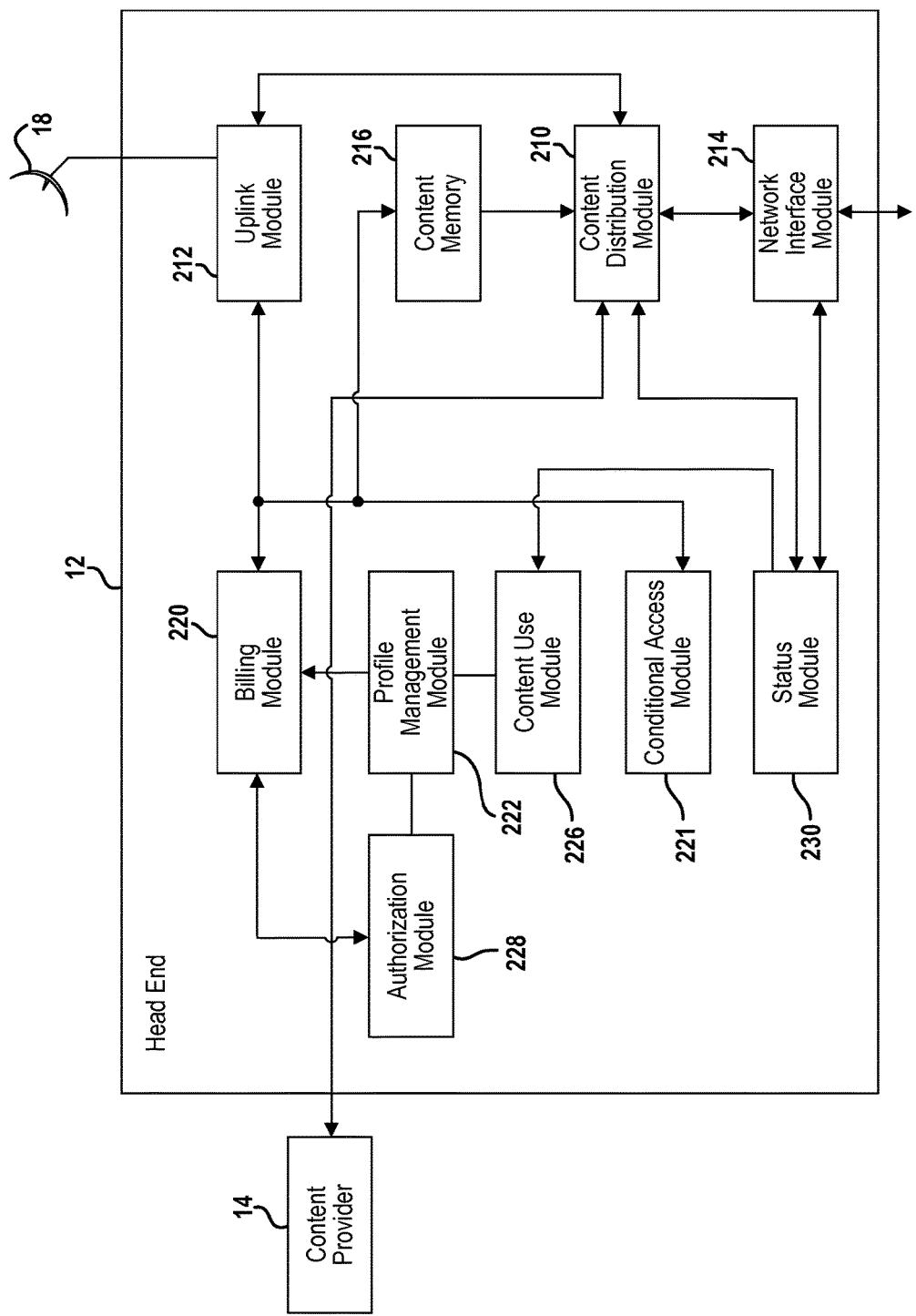
FIG. 2 is a block diagrammatic view of a head end according to the disclosure.

Referring now to FIG. 2, details of the head end 12 relevant to the present example are set forth. It should be noted that the head end 12 is illustrated within one box which may represent one or more facilities. That is, each of the individual components illustrated within the head end 12 may be physically located in various locations separate from the user devices The head end 12 may include a content distribution module 210 that is used for distributing content through different means. The head end 12 may be in communication with an uplink module 212 for uplinking content to the satellite illustrated in FIG. 1. The content distribution module 210 may thus format the signal in an appropriate format for uplinking through the uplink module 212. The uplink module 212 may uplink various content including a first content and a second content through the satellite to the user devices. The content distribution module 210 may also transcode the content in a format suitable for use by the receiving device.

The content distribution module 210 may also be in communication with a network interface module 214. The network interface module 214 may be in communication with the network 42 for communicating content or data therethrough. The network interface module 214 (or the content distribution module 210) may format the content signals into internet protocol signals for distribution through the network 42.

The content distribution module 210 may also be in communication with content memory 216. The content memory 216 may be referred to as a content repository. The content memory 216 may receive content from the content provider 14 for distribution through the satellite system or the network 42. The content memory 216 may save on-demand or pay-per-view content therein.

The content provider 14 may also provide live television content for distribution through the content distribution module 210. The content distribution module 210 may thus communicate live content through the uplink module 212 or through the network interface module 214 to the appropriate networks.

A billing module 220 may also be incorporated into the head end 12. The billing module 220 may be used for associating one or more user profiles with a user account. Different user devices or user receiving devices may be assigned to each profile. For example, different types of user devices such as a plurality of mobile devices and one or more fixed set top boxes may be associated with a user account. The billing module 220 may also keep track of subscriptions that each user is subscribed to, PPV purchases and on-demand purchases.

The uplink module 212 may also communicate conditional access data to the user devices for accessing the content. The conditional access data may be communicated in a conditional access packet that includes data for tuning the user device to receive the data. The conditional access data may be received directly or indirectly from conditional access module 221. The conditional access module 221 may provide conditional access signals to the billing module 220 to allow a particular user access to content. The conditional access module 221 may generate a conditional access packet together with data from the billing module 220 for uplinking through the uplink module 212. If the content is satellite content, access data such as but not limited to the particular transponder, channel and time at which the content is broadcasted may be provided in the conditional access packet. If the content is to be provided over an internet or other broadband-type network, the IP address of the content may be provided. The conditional access packet may also include encryption/decryption information for the user device to receive the content and decode the content.

A profile management module 222 may be used to associate profiles having profile settings associated with the user account. The profile management module 222 may be an automated system through which the user or account holder calls or accesses remotely by computer or user device to create and associate a plurality of profiles with the account. The profile management module 222 may also be partially human activated in which a customer service representative enters the data for multiple profiles associated with the account.

The profile management module 222 may store user account data, such as an account identifier, with associated profiles also having a profile identifier associated therewith. Each profile associated with an account may have a unique profile identifier associated therewith. Each profile may have a plurality of profile settings. The profile management module 222 may update the profiles based upon a user input to form revised profile settings. In some examples, only a master account may change the profile settings.

The head end 12 may also include a content use module 226. The content use module 226 may receive and store data about the content used by each profile in the profile management module 222. A the user uses the content revised content use data may be communicated back to the content use module 226 and stored in the head end. The content use module 226 may save playlist data, view history data, position status data such as pause position data and resume data position and other types of data. Pause and resume data may save a frame or time of video paused on one device so that it may be resumed on another device. Ultimately the content use data may be stored with the profile settings.

Different user profiles may have different pause and resume data even for the same piece of content.

The head end 12 may also include an authorization module 228. The authorization module 228 may allow a user to access the profile management module 222. The authorization module 228 may, for example, be associated with a website such as a "directv.com." The authorization module 228 may be in communication with the billing module 220 to verify entered data and update user data. The authorization module 228 may present a screen interface for entry of a password or other code that, once verified, allows access to the profile management module 222. The interaction of these components will be described in more detail below.

A status module 230 may also be included within the head end 12. The status module 230 may receive a position status signal from one of the user devices through the network 42. The status module 230 may, for example, receive the position status of the content. Many position status signals may be maintained per profile and per piece of content. That is, the content position of one or more different positions for different content titles may be stored. The position status signal corresponds to a content position last used or last viewed within the content. The time or time code of the exact frame the user left off at may be used. A second position status signal may be generated at the status module 230 to be sent to a second user device when that second user device requests access to content previously accessed by a first user device. For example, if a user stops or pauses content, a time code or other time indicator may be saved for that particular content for the user. When content playback of a previously viewed (but not completed) content is received, a position signal is generated to determine possible position. The user may then be prompted to restart the content from the position the previous viewing left off. This will be described further below.

Figure 3A:
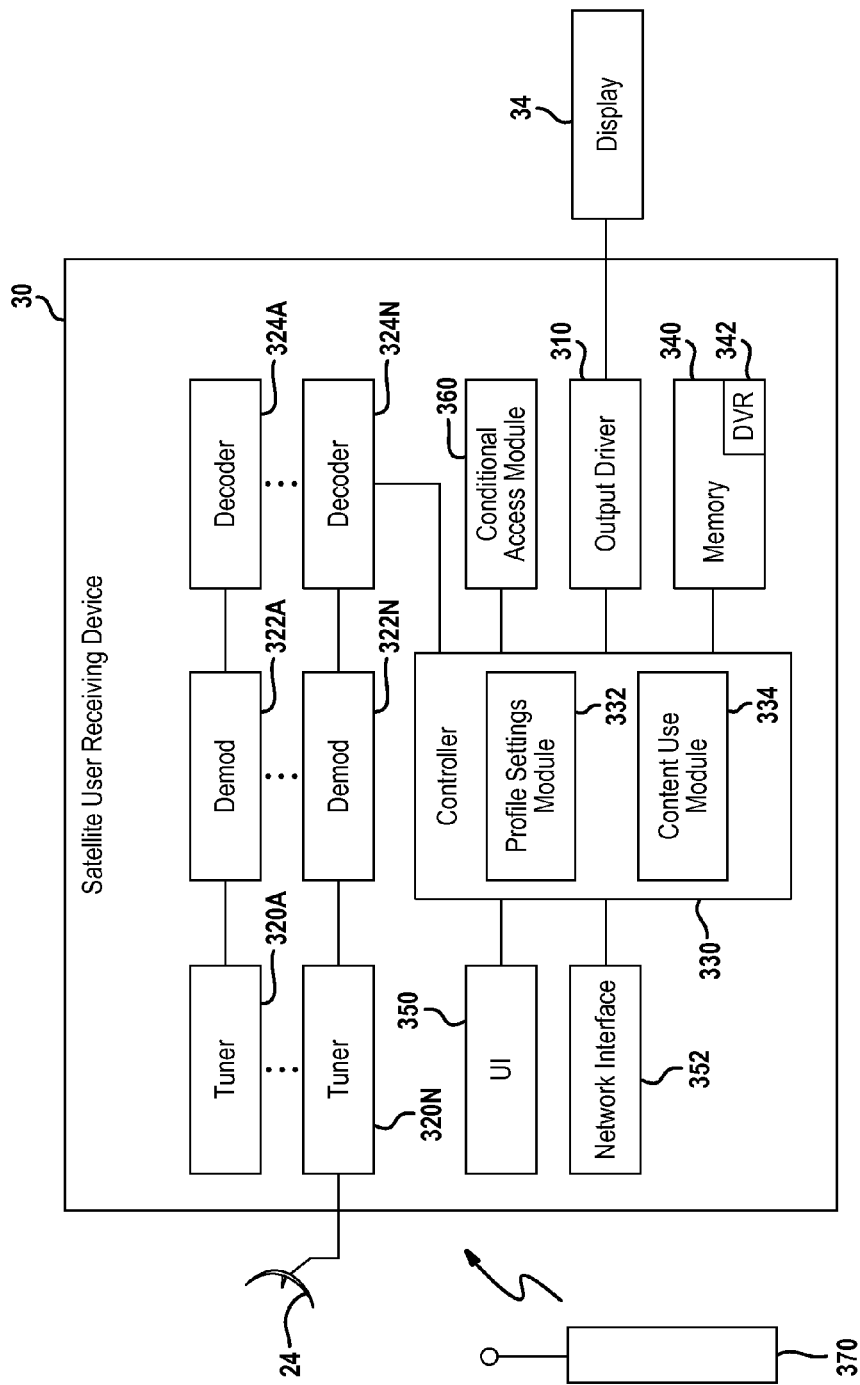
FIG. 3A is a block diagrammatic view of a satellite user device.

Referring now to FIG. 3A, the user receiving device 30 such as a set top box is illustrated in further detail. Although, a particular example using the set top box is illustrated, it is merely representative of various electronic devices with an internal controller used as a content receiving device. The antenna 24 may be one of a number of different types of antennas that may include one or more low noise blocks associated therewith. The antenna 24 may be a single antenna used for satellite television reception. Of course, multiple antennas for receiving signals from satellites in different orbital slots may be used. In a terrestrial system such as a cable television system, no antenna may be used. Rather, a connector to a fiber optic or coaxial cable may be used. The user receiving device 30, as described above, is coupled to a display 34. The user receiving device 30 may have an output driver 310 for formatting video and audible signals for the display 34.

A controller 330 may be a general processor such as a microprocessor that cooperates with control software. The controller 330 may be used to coordinate and control the various functions of the user receiving device 30. These functions may include tuner 320A-320N (collectively 320), demodulator 322A-322N (collectively 322), decoders 324A-324N (collectively 324) such as forward error correction decoders and any buffer or other functions.

The controller 330 may include a profile settings module 332. The profile settings module 332 may store the profile settings or other settings that may be changed by the user during operation of the user receiving device. The profile settings may include but are not limited to a household profile, a purchase restriction, the ability to buy pay-per-view and on-demand content, the ability to pay bills, parental controls authorized devices for using the profile and the like.

The controller 330 may also include a content use module 334. The content use module 334 keeps track of content used by the user receiving device 30. The content use module 226 may include a viewing history list that includes a viewing history data for the various content viewed at the satellite user receiving device. Pause and resume position data may be stored and provided to a requesting device after a request signal is received. For example, the content use module 334 may provide a playback status signal corresponding to the last played or last viewed position within the content. As mentioned above, the last played position of the content may correspond to a frame number in a time code of the content or an elapsed time since the beginning of the content. Other representations of time or time indications may also be provided to correspond to the last played position of the content. User receiving devices and user devices using content may periodically provide a playback status to the head end so that other profiles, user devices or user receiving devices may resume playback at the last point viewed by the user of the user receiving device 30.

The tuners 320 receive the signal or data from the individual channel. The tuners 320 may receive data from a satellite or a source such as cable or over-the-air TV broadcasts. The tuners 320 may receive television programming content, program guide data or other types of data. The demodulators 322 demodulate the signal or data to form a demodulated signal or data. The decoders 324 decode the demodulated signal to form decoded data or a decoded signal. The controller 330 may be similar to that found in current DIRECTV® set top boxes which uses a chip-based multifunctional controller. By providing a number of tuners, demodulators and decoders, a number of different content programs may be used by the receiving device. For example, live viewing and recording may be performed simultaneously. A number of recordings may be made simultaneously depending on the number of tuners available.

The controller 330 is in communication with a memory 340. The memory 340 is illustrated as a single box. The memory 340 may be implemented as a plurality of different types of memory including the hard drive, a flash drive and various other types of memory. The memory 340 may be other types of memory or sections of different types of memory. The memory 340 may be non-volatile memory or volatile memory. The memory 340 may include a DVR 342. The DVR 342 may include recorded content stored for later playback.

The memory 340 may include storage for various operational data collected during operation of the receiving device 30. For example, the memory 340 may store a profile with profile settings or the data used to build the profile. Another type of data in the memory 340 may include the content use data, channels subscription data, the blocked channels, adult channels, rating limits set by the user receiving device 30, current set top box language, TV resolution data, to do list data, the conditional access module identifier, time zone data, time of day daylight savings, status data, aspect ratio data, viewing hours data, quick tune list and a zip code.

The memory 340 may also store the program guide data. The memory 340 may store program guide data that is received at the head end. The program guide data may include amounts of data including two or more weeks of program guide data. The program guide data may be communicated to the user receiving device 30 in various manners including through the satellite 22 of FIG. 1. The program guide data may include content or program identifiers, and various data objects corresponding thereto.

The user receiving device 30 may also include a user interface 350. The user interface 350 may be various types of user interfaces such as a keyboard, push buttons, a touch screen, a voice activated interface or the like. The user interface 350 may be used to select a channel, select various information such as content selections, change the volume, change the display appearance, or other functions. The user interface 350 may also be used for selecting playback locations of the content.

A network interface 352 may be included within the user receiving device 30 to communicate various data through the networks 36/42 described above. The network interface 352 may be, alone or in combination, a near field communication port, WiFi, WiMax, WiMax mobile, wireless, cellular, or other types of communication systems. The network interface 352 may use various protocols for communication therethrough including, but not limited to, hypertext transfer protocol (HTTP).

The user receiving device 30 may also include a conditional access module 360. The conditional access module 360 prevents unauthorized reception of the television signals through the antenna 24. The conditional access module 360 may use a cryptographic hash to authorize the use and display of the received signals. The conditional access module 360 may receive the proper codes or signals from the head end.

The user interface 350 may also be used together with a remote control device 370. The user interface 350 is typically used to control the display and the user receiving device associated therewith. The remote control device 370 may also perform various other non-typical functions, including transferring profile settings or initiating profiles at a user receiving device. Details of this will be described below.

Figure 3B:
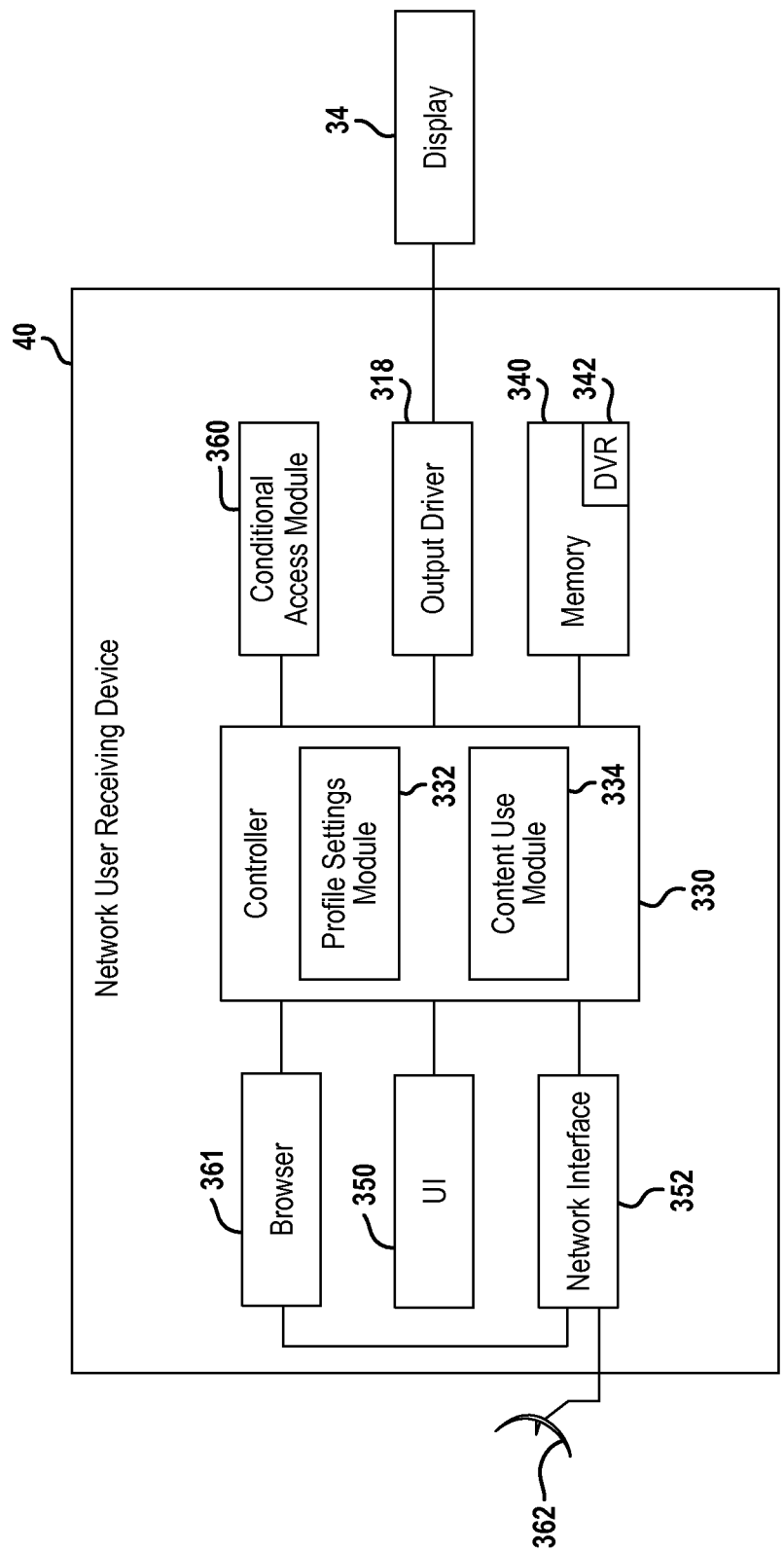
FIG. 3B is a block diagrammatic view of a network user device.

Referring now to FIG. 3B, a user device 40 is set forth. In this example, the same components from FIG. 3A are not described again. In this example, a browser 361 may be used to receive content and communicate data to the controller 330. The data may include a position status signal. The browser 361 may also communicate playback status signals to the head end through the network. The browser 361 may be in communication with the network interface module 352. The network interface module may communicate wireless signals through the antenna 362.

Referring now to FIG. 4A, a primary remote control device 370 is illustrated. The primary remote control device 370 may include various buttons and switches to provide key values to the set top box to provide various inputs. An ON button 410 and an OFF button 412 may be provided for turning on and off a television and receiving unit. A power button 416 may also be provided for turning on and off power to a device selected by the switch 414. A TV input button 417 may also be provided for providing an auxiliary input to the television. A format button 418 may be used for selecting the format of the screen display such as standard definition or high definition. A DVR control portion 420 may also be provided. The DVR control buttons may include a play button 422, a forward button 424, a reverse button 426, a stop button 428, a repeat button 430, a pause button 432, a record button 434, and a jump button 436. A guide button 440 may be used for displaying the program guide. An active button 442 may be used for accessing special features, services and information such as news. A list button 444 may be used to display a to-do list of programs. This may be associated with the digital video recorder. An exit button 446 exits the menu screen and the program guide. Arrow keys 448 may be used to move around in the program guide and various menu screens.

A select button 450 is used to choose or select a highlighted item in a menu or in a program guide. A back button 452 may be used to return to a previously displayed screen. A menu button 454 may be used to display a menu. An information button 456 may be used to display the current channel and program information when watching live television or in the guide. Color buttons 458 may be used to cycle through various available alternative audio tracks. The colored buttons may also give various functionality and various menus within the receiving unit.

A volume switch 460 may be used for increasing or decreasing the volume. The volume switch 460 may be a rocker switch. A channel or page button 462 may also be a rocker switch. The channel or page button 462 may be used to select the next higher or lower channel or higher or lower page in a program guide menu. A mute button 464 may also be provided. The mute button 464 may turn the sound from the receiving unit on or off. A previous button 466 may be used to return to the last viewed channel. Numerical buttons 468 may have a number and a letter assigned thereto. By selecting a number, a number key value may be provided to the receiving unit for inputting a particular number into a menu when making a selection. The number buttons 468 may also be used for providing letters into the receiving unit. For example, the "2" button may also have "A B C" associated therewith. A keypad for a telephone is similarly configured. A dash key 470 may be provided for inputting a dash for a sub-channel number. An enter button 472 may be used for entering the code in a menu.

The remote control device 370 may also be used to select a user profile. User profiles may be stored within the remote control device 370. The profiles may be received from a user receiving device. To switch between different user profiles a multi-position switch 474 is used. In this example, the multi-position switch 474 has six positions for user 1, user 2, user 3, user 4, user 5 and user 6. Of course, various other numbers of users may be provided. By changing the selection of the switch 474, the remote control device may communicate a user profile and content use data to a user receiving device. The user receiving device 30 may then be customized for the particular user. That is, the user receiving device may then operate using the user profile along with the content data.

Referring now to FIG. 4B, a simplified block diagrammatic view of the remote control device 370 is set forth. The switch 474 is in communication with a controller 476 that has a profile settings module 478 and a content use module 480. A profile settings module is used to retrieve the profile settings from a memory 482 and communicate the profile settings to a user receiving device through a transmitter 484. The transmitter 484 may be one of many different types of transmitters including a near field communication transmitter, a WiFi transmitter, a WiMax transmitter, a Bluetooth transmitter or the like. Content use data may be transmitted using the content use module 480 through the transmitter 484. Various types of content use data such as resume or pause position data, playlist data, history data and playback lists may be communicated. Favorite setting data and the like may also be provided within the content use module. The content use module 480 may perform similar functions to the content use modules set forth above within the user receiving device.

A receiver 486 is also in communication with the controller 476. The receiver 486 is used to receive signals from the user receiving device 30. The receiver 486 may use technology corresponding to that of the transmitter. Multiple technologies may be supported.

A keypad controller 488 is used to communicate keypad switch signals to the controller 476. These signals may be communicated through a conventional IR or RF transmitter for 490. In this example, the remote control device 370 may have a traditional infrared or RF transmitter 490 as well as the transmitter 484 that is suitable for communicating data such as the user settings and the content use data. Of course, the IR or RF transmitter 490 may be used for this purpose.

In operation of the remote control device 370, profile settings and content use data may be saved within the memory 482. Once the switch 474 is selected, profile settings for the particular user profile are communicated to the user receiving device. Content use data may change during the use of the user receiving device. If changes are made, the user receiving device 30 may communicate the changes to the remote control device 370 through the receiver 486.

Referring now to FIG. 5, a method for associating profiles with a user account is set forth. In step 510, account holder accesses the authentication server. This may be performed by logging on to a webserver associated with the head end. In the present example "directv.com" may be logged onto in order to access the authentication process. In step 512 the user provides a password, key or other type of authentication. The authentication server compares the key or other password with the password or key stored at the authentication server. When the entered key or password and the saved key or password are the same, the user is authenticated. The authentication performed in steps 510 and 512 may be performed when the user is trying to access the profile management module associated with the head end. The authentication process may also take place prior to trying to access the profile management module. Once authenticated an account or user identifier may be associated with the session.

After step 512, step 514 allows the user to access the profile management module associated with the head end. In step 516 a profile interface is selected by the user. In step 518 a first or master profile is associated with the user account. This profile may control the different levels of privileges of any sub-profiles thereunder. As mentioned above, a user account may have a master profile associated therewith along with a plurality of sub-profiles. In step 520 the first profile settings are assigned to the first profile. The profile settings may include but are not limited to parental controls, purchase restrictions such as pay-per-view, on-demand, dollar limits, devices able to access the profile, the ability to pay bills and the like.

In step 522, a second (and subsequent profiles) may be associated with the user account. The second and subsequent profiles may be referred to as a sub-profile that may have fewer privileges than those of the master or first profile. In step 524 second profile settings are assigned to the second user account. Other accounts may be assigned different privileges than the second profile. The second and subsequent user settings may thus has fewer privileges than the first or master profile.

Referring now to FIG. 6, a method of using profiles to control various devices is set forth. By storing the profiles within the head end, a user may transfer his settings and content data to various devices including the mobile device, the computer or another user receiving device. Such as those set forth in FIG. 1. In step 610 the profile management module is accessed. This may be accessed in a secure manner using the authentication described above in FIG. 5.

In step 612 a first profile may be assigned to a first user receiving device. In step 614 the first user profile settings of a first profile may be communicated to the first user receiving device. This may be performed as a default such as in a household. A first user receiving device may be associated with a first profile so that during operation of the user receiving device, such as a set top box, a user is not required to log in.

Once the assignment is made at the profile management module, the user receiving device may be remain using that profile until the profile management module is accessed and changed in the future.

In step 616 a second profile is assigned to a second user receiving device. As mentioned above, the second profile may be a sub-profile corresponding to the user account. It is possible to have more than one profile may be assigned to any one device at a time. In step 618 the second profile settings are communicated to the second user receiving device. In this example, the second profile may be communicated to a second user receiving device in the same household as the first user receiving device. The second user receiving device may also be a mobile device such as a tablet computer, mobile phone or another type of device. Again, the second user receiving device may operate by default with the second profile settings until the profile management module is accessed again at the head end and changes to the profile are made.

In step 620 the first user receiving device is operated with the first profile settings. In step 622 the second user receiving device is operated with the second settings.

In step 624 content use data is generated at the first user receiving device. Content use data may include resume position points, pause position points, playlists and a history of content played back at the first user receiving device. In step 626 a content use data signal is communicated to the head end. As mentioned above, the content use data may comprise many different types of data. In step 628 the content use data is communicated and associated with a first profile. It should be noted that in step 626 the content use data signal may include a user identifier and/or a profile identifier. Step 628 associates the content use data in the content use data signal with the first profile. The content data may thus be stored with the proper profile data at the head end.

Steps 624 through 628 presume that no existing content use data exists. As mentioned above, content use data may also be stored in the head end with the profile settings data. Steps 614 and 618 above may communicate first profile settings, first content use data and second content use data to the first and second user receiving devices respectively. Steps 624 through 628 may be used to update content use data that was changed at the user receiving device. In other words, content use data may change during the operation of the first or second user receiving devices. Step 626 may then be communicating revised use data.

Referring now to FIG. 7, a detailed block diagrammatic view of one example of the profile management module 222 is illustrated in communication with a user device 710. In this example the user device 710 may be one or more of the user devices or user receiving devices illustrated in FIG. 1 such as a mobile user device, a set top box, a tablet computer, a mobile phone or the like. The profile management module 222 may include IT middleware 720 that is in communication with a user profile module 722 and systems of record modules 724. The IT middleware may also be in communication with the user devices 710. The systems of record module 724 may include an engineering systems of record module 726 and an IT systems of record module 728. The engineering systems of record module 724 may be in communication with a reporting module 730, which monitors the system.

The user profile module 722 may include various profiles of the user devices including an entertainment profile 740, a set top box profile 742, a device profile 744, a video profile 746, a parental control profile 748 and other profiles 750. The user profiles may be stored in a user profile store 752 located between the user profile module 722 and the systems of record module 724. The user profile store 752 may include engineering data 754 and IT data 756. The interaction of the devices is described further below.

Referring now to FIG. 8, a DIRECTV® 810 is illustrated as having a master profile 812 associated therewith. The master profile 812 may be assigned upon first registering with the "dot com" server at the head end. In the present example, "directv.com" is the server that may perform the "dot com" registration. The master profile 812 includes three sub-profiles in this example. Sub-profile 1 has administrative privileges, may create more profiles and can order pay-per-view. Sub-profile 2 includes no administrative privileges but can order pay-per-view. Sub-profile 3 has no administrative privileges and cannot order pay-per-view. FIG. 8 is merely one example of the different types of privileges and structure that may be provided within the sub-profiles.

Referring now to FIG. 9, a screen display 910 illustrating an account overview for the master profile is set forth. In this example, a "my profiles" tab 912 brings up various profiles. An add profile selector 914 may be displayed on the screen so that the master profile user may add further profiles. A summary of the profiles is provided in the first column 916. Names may also be associated with the profiles in column 918. The various privileges for each profile may be displayed on column 920. The parental controls may be associated with content allowed for the viewers in column 922. Column 924 displays the purchase restriction associated with each profile. The devices associated with each profile may also be displayed in step 926. In this example, the devices may include a first personal computer (PC 1), a first iPhone® (iPhone® 1), a first Macintosh® computer (Mac-1), a second iPhone® (iPhone® 2), an iPad® (iPad® 1), a second PC (PC 2), an Android® device (Android® 1), a second iPad® (iPad® 2). In column 928 an edit profile button 930 is provided in each profile row. Each profile corresponds to a single row. If one of the profiles is desired to be edited, the edit profile screen display button 930 is selected. By way of example, sub-profile 1 is associated with the name "Jane", has administrative privileges, has parental controls corresponding to R, has no purchase restrictions and is associated with a first Macintosh®, the second iPhone® and the iPad® 1. Sub-profile 2 is associated with the name "Janey", has user privileges and not administrative privileges, has parental controls restricted to PG-13 and TV-G, has purchase restrictions and is associated with only devices iPad® 2, Android® 1 and Personal Computer 3. Sub-profile 3 is associated with the name "Johnny", has user privileges and not administrative privileges, has parental controls restricted to G and TV-Y, has purchase restrictions and is associated with only device iPad® 1. To add further profiles an add profile button 932 may also be selected.

A summary button 934 may be selected to display the summary illustrated in 910.

The screen display 910 may be reached through the head end and associated servers. By accessing the profile management module 222 of the head end 12, the screen display 910 may be associated with an access device. In this example, the profile management module 222 may be accessed through various computing devices including mobile computing devices. These devices may or may not be the same computing devices used for playing back content.

Referring now to FIG. 10, a screen display 1010 is illustrated when the "add profile" selector 914 is selected in FIG. 9. In this example, a fourth sub-profile, sub-profile 4 is created and added. In this example, a name box 1012 is used for entering a new name. A password box 1014 and a confirm password box 1016 are used to associate a password with the user profile. Privileges may be assigned in privileges box 1018. The privilege box 1018 may have various choices which, in this example are administrative at 1020 and user 1022. An email may also be associated with the sub-profile. An email box 1024 is provided for entering an email. A parental controls area 1026 may include a movie parental control box 1028 and a television parental control box 1030. The maximum viewable level of movies and TV may be set independently.

A purchase restriction box 1032 may be provided with a "no" selection 1034 and a "yes" selection 1036. By selecting yes or no, purchase restrictions may be authorized or not authorized. A save box 1040 may be used to save the entered profile. A cancel box 1042 may be selected to cancel the addition of the profile illustrated in 1010.

Referring now to FIGS. 11A and 11B, one example of the end state of a product that includes multiple profiles is set forth as a flow chart. In FIG. 11, the various rows correspond to the master profile, the first sub-profile, the second sub-profile and the third sub-profile. In step 1110 the process is initiated. Step 1112 initiates the set-up of a master profile and sub-profile at a head end server such as "directv.com" as used in the above example. In step 1114, sub-profiles with various privileges are created. In step 1116 a sub-profile 1 with administrative privileges is created. Parental controls corresponding to "R-rated programs" may be established in step 1118.

After step 1114, step 1120 may also be performed which created a second sub-profile with a parental rating of PG-13 and TV-G in step 1122.

After step 1114, step 1124 may be performed. The parental controls for sub-profile 3 may be set at G movie ratings and TV-Y ratings for television shows in step 1126. After step 1114, the parental controls may be established in step 1130. In step 1132 it is determined whether or son or daughter is determined based upon the sub-profile. After step 1132 the parental controls may be obtained.

In step 1136, purchase restrictions are set. Box 1138 determines whether wife or kids profiles are established. If a wife profile is established step 1140 allows purchases. If kids are established as kid profiles, step 1142 does not allow purchases for either child.

Device assignments may also be performed. Device assignments are performed in step 1144. The device assignments may include a wife/kids box that may determine whether wife or kids are intended in step 1146. In step 1146 if a wife device assignment is performed, the association of various devices with the wife may be performed in step 1148. In step 1148, the wife is given access through a PC, iPhone®, iPad® and all user receiving devices such as set top boxes.

When kids are determined in box 1146, step 1150 allows access through a PC, iPad® and a specific set top box, such as that in the daughters room. When step 1146 determines that the son's profile is being assigned, step 1152 allows access through an iPad® and a specific set top box, such as a set top box in the child's room.

After step 1144, the device information may be made available through customer care in step 1154.

All four devices set forth in the present example may have playlists synchronized to the various devices. Box 1156 synchs the playlists between the set top box or other user receiving device and the mobile devices associated with each profile or sub-profile.

Box 1158 illustrates examples of pausing and resuming content on various devices. Boxes 1160 and 1162 represent pausing content on a dot com such as "directv.com" and resuming the content on the iPad®, respectively. That is, in this example, if content is being viewed from the dot com using the master profile it may be resumed on the iPad® when a position signal is communicated and saved within the head end. When the master profile on another device such as the iPad® attempts to access the same content, the position signal may be retrieved and a decision box to prompt the user to resume at the last position may be generated. An example of this will be provided below.

Boxes 1164 and 1166 respectively illustrate pausing content on the smartphone and resuming content on the set top box or other user receiving device. When pausing content on the smartphone, the position signal may be communicated to the head end. When the set top box resumes the content played on the smartphone, the user may be prompted to resume at the last position.

Likewise, boxes 1168 and 1170 correspond to pausing content in the iPad® and resuming content on a dot com. In this example, the position signal is communicated from the iPad® to the head end through one of the various networks described above. When the same content is accessed through the dot com, the user may be prompted for resuming the content at the last known position relative to the profile active at the dot com.

Boxes 1172 and 1174 illustrate the scenario where the content is paused on the set top box associated with sub-profile 3. When sub-profile 3 is active on the iPad® and the content is resumed or attempted to be resumed a query display may be provided as whether or not the user desires to resume from the last known position that was saved at the head end. The last position signal may then be communicated to the iPad® so that content may be played back therefrom.

Referring now to FIG. 12, control of a user receiving device such as a set top box may be coordinated with the local user settings of the set top box. That is, when the customers set up an account, an option may be provided to establish parental controls for each profile as was described above. Another option to set the parental controls for each set top box may also be provided. If the user selects the device based option, the set top box would use the local parental controls directly regardless of a profile assigned to the set top box. However, the device based controls is not set then the system will automatically apply the profiles based control for the set top box. The set top boxes may, for example, default to using the device based control. An option to choose profile based parental control may be established during the generation of a user profile. If the user updates the parental control at the set top box for a profile based control, updates will be applied to the profile. The user may be asked for a personal identification number if the selected content exceeds parental controls. An error message may be generated if the selected content exceeds the user rating.

More specifically, in step 1210 the user changes the set top box parental control settings. Step 1212 determined whether the set top box is internet activated. The following example uses a set top box as one possible user receiving device. When the set top box is internet activated in step 1212, step 1214 sends new parental settings data to the head end. In step 1216, the parental control update mode is exited.

Referring now to FIG. 13, step 1310 updates the set top box parental control settings through the dot com server. In step 1312 the head end notifies the affected set top box and provides updated parental control settings. The set top box may have the updated parental controls settings communicated through a satellite or terrestrial network such as the internet. In the case of a satellite, a conditional access packet providing the updated parental control data is communicated to the set top box. In step 1314 the set top box updates the parental controls to the new parental controls. This may be also confirmed by communicating a confirmation signal from the set top box to the head end. Step 1316 is an optional step.

In step 1318 the parental control mode is exited.

Referring now to FIG. 14, a screen display 1410 of a mobile device illustrates the selection of a content by poster 1412. The poster 1412 along with a "watch now" box 1414 allows the user to select the content. It should be noted that the rating 1416 is "R." As described above, the screen display 1410 illustrates sub-profile 2 which has a maximum viewing limit of PG-13 and TV-G. The sub-profile 2 is thus not allowed to view content with an "R" rated content. A screen display 1430 illustrates a blocking screen 1432 that is used to block and warn the customer regarding the rating. An "unlock now" button 1434 may provide the user with a way to unlock the content. By selecting unlock now, the user may be prompted for a personal identification number. Box 1436 may be selected if more movie information is needed by the user by selecting the more info box 1436 a request for data may be communicated through the network so that content data may be communicated to the user device. This may allow a decision as to whether to provide access to content.

Referring now to FIG. 15, a state diagram of a process for performing, pausing and resuming content is set forth relative to the components set forth in FIG. 7. The process begins in one of the user or user receiving devices 710. The initial state is the operation of one of the user or user receiving devices playing or displaying content. In step 1510 a title or content is paused. Step 1510 communicates the paused content title or other identifier to the user profile module 722 together with position data corresponding to a position of the location within the content last viewed. The profile identifier and/or user device identifier may also be communicated to the user profile module 722. The user profile module 722 receives the identifiers and a content position signal having a time code or time identifier.

The user profile module 722 communicates the data to IT and engineering data stores 754 and 756 of user profile store 752 in step 1512. In step 1514, the user profile store 752 communicates a synch signal such as a post office protocol (POP) synch signal to the user profile module 722. In step 1516 a resume content request is communicated from one of the user devices to the head end. This request may include a user or profile identifier, a user device identifier and a content identifier. The user profile module 722 communicates a position for the content to the requesting user device in step 1518.

Step 1520 communicates a systems of record update signal from the IT and engineering data stores 754 and 756 of user profile store 752 to the IT and engineering systems of record module 724. Therefore, as a content is paused the position identifier as well as the profile or user device is updated. When another request from the same device or another device is received, the position is retrieved and communicated to the second requesting device. The user may then resume from the beginning or restart from the exact place the system left off.

Referring now to FIG. 16, a method for performing pause and resuming the play of content in a non-multi-room viewing system is set forth. Multi-room viewing is when the output of a set top box or user receiving device may be shared within a home. That is, in a typical multi-room viewing situation, one set top box may play content from another set top box. The following example uses a set top box as one example of a user receiving device.

In step 1610 a user selects video on-demand or play list content to play. In step 1612 the parental control settings for the profile or user receiving device is checked. The system does not proceed if the parental setting data for the selected content do not allow playback. In step 1614 it is determined whether the set top box is internet connected. If the set top box is not internet connected, step 1616 plays the content from the start location or from the locally stored pause point for the content. That is, the set top box itself may store a position signal therein. Step 1616 may retrieve the position signal and determine whether the user would like to resume at that point or at the beginning of the content selected. In step 1618, the playback is exited.

Referring back to step 1614, when the set top box is connected to the internet, step 1618 is performed. The set top box, in this example, generates a request for content data from the head end for a position signal relative to the content. The request may include a profile identifier, a content identifier and a query for any previous pause point or position. Step 1618 is activated when a content is resumed or selected to be played back from a user device in step 1620. After step 1618, step 1622 receives a response signal from the head end. If the response signal is zero pause or position (data) points, step 1624 plays the content from the beginning.

After step 1622, if zero pause points are not provided, step 1626 determines whether one pause position point or position signal has been provided. If only one pause position point is provided, step 1628 plays the content from the previous position.

Referring back to step 1626, if the head end provides more than one pause point, step 1630 displays the pause position points and generates a screen display offering the different pause points for selection. These pause points may include a screen capture of a frame of video in the scene corresponding to the pause position point. After step 1630, step 1632 plays the content from the selected pause point.

After steps 1624, 1628 and 1632, step 1634 determines whether the content has been exited when the viewing of the content is finished. In step 1634 if the content was finished, step 1636 notifies the head end with no pause point data and the system exits playing in step 1638. In step 1634, if the content was exited without finishing, step 1640 generates a revised position signal and communicates the position signal to the head end with a profile identifier, the content identifier and a user receiving device identifier. The revised content use data is communicated to the profile management module of the head end for future use.

Referring now to FIG. 17, a method for performing, pausing and resuming in a multi-room viewing or central server type system is set forth. In step 1710 the user selects content for playback from a set top box that may also act as a server. In step 1712 the parental control settings are checked to determine whether the playback of the content is authorized. If the parental control settings are appropriate, step 1714 checks to determine whether the client or server set top box is connected to the internet or another network. In step 1716, the content is played back from the server stored pause position point if no connection is available. The system ends the process in step 1718.

Referring back to step 1714, if either the client or server set top box is connected to a network such as the internet, step 1720 communicates a request signal to the head end for pause position points for the content. A content identifier, a profile identifier, an account identifier or a user identifier may all be communicated to the head end in the request signal. In step 1722 it is determined whether zero pause points have been provided. If zero position points have been provided, step 1724 starts the playback of the content from the start. In step 1722, if pause position points have been provided, step 1726 is performed. In step 1726 if the head end provides one pause point, user receiving device plays back the content from the only pause point in step 1728.

After step 1724 and 1728, step 1730 determines whether the content was exited after being finished viewing. That is, it is determined whether the content was exited at the end. If the content was exited at the end, step 1732 notifies the head end and no pause point is saved. Step 1734 ends the process.

Referring back to step 1730 when the content was not exited at the end, meaning that the content was not finished, step 1736 notifies the head end using a notification signal that the content with a particular content identifier and particular position data signal. This may be communicated with some other type of identifier such as a profile identifier, user identifier, or user device identifier. This data is sent to the profile management module 222 of the head end and saved therein.

After step 1736, step 1738 sends the pause point or position signal to other user receiving devices in the network system. Thus, both the head end and other set top boxes in the system are updated. The system exits playing in step 1734.

Referring back to step 1726, when the head end does not provide one pause point, that is, more than one pause point has been communicated, step 1740 displays the pause position points from all the set top boxes and devices within the network and from the head end. In step 1742 if the selected position point is from or owned by the requesting set top box, step 1744 plays the content from the selected pause point. In step 1742 when the content is from (or owned by) another set top box, step 1746 plays back content from the other set top box pause point. After step 1746, step 1748 does not notify the head end but the pause point is communicated to the other set top boxes in the system in step 1738.

Referring now to FIG. 18A, a sample of a screen display asking for resuming of playback from a last position is set forth. A selector 1812 for selecting yes or no may be generated for resuming the content from a last position. The location such as "the living room" may be changed to the last known device that played back the content.

Referring now to FIG. 18B, a screen display 1820 is displayed with three selectors in this example. One of the selectors may be selected by the user. The first selector 1822A corresponds to resuming playback from the beginning position of the content, the second selector 1822B corresponds to a first position signal at six minutes three seconds into the content. The third selector 1822C corresponds to a position seventeen minutes and thirteen seconds into the content. A poster 1824 is adjacent to second selector 1822B and third selector 1822C showing a frame of the content around at the resume position. By using the remote control or other user interface, a selection signal may be communicated to the set top box or other device for the appropriate position.

Referring now to FIG. 19, a state diagram for determining purchase restrictions is set forth. In step 1910, a purchase restriction or purchase restriction data is stored within the head end with profile data. The purchase restriction data is communicated to the IT and engineering data stores 754 and 756 of user profile store 752 in step 1912. The purchase restriction data is communicated to other modules within the user profile module 722 in step 1914.

When a user device requests the purchase of a content in step 1916, the infrastructure and services module determines whether the purchase restriction is over a pre-defined limit or if the purchase is outright restricted. If restrictions are present, the head end generates a restricted data signal in step 1918, which is communicated to the requesting device. The requesting device may then generate an indicator of a denial of purchasing. In step 1920, a systems of record update signal may be communicated from the IT and engineering data stores 754 and 756 of user profile store 752 to the IT and engineering systems of record module 724.

Referring now to FIG. 20, a method for updating a playlist is set forth. In this example, mobile devices 710 are used as the user devices. The playlist device is a set top box 2010. A playlist server 2012 has a connection from the set top box 2010. The set top box 2010 communicates a playlist in step 2014 to the playlist server 2012. Of course, the playlist server may be incorporated as part of the profile management module 222 or the content use module 226 illustrated in FIG. 2. In step 2016, one of the user devices 710 requests playlist synchronization (synch) by generating a playlist request signal and communicating the playlist request signal to the profile management module 222. The playlist request signal may include a profile identifier, a user account identifier or a user device identifier. Of course, more than one of the above types of identifiers may be used.

In step 2018, a data store synch signal may be generated and communicated to the server 2012. In step 2020, the server 2012 generates a synch command and communicates the synch command to the set top box 2010. In response, the set top box 2010 communicates playlist data in step 2022 to the user profile module 722 of the profile management module 222. In step 2024, a data store synch signal is communicated from the infrastructure and services module to the IT and engineering data stores 754 and 756 of user profile store 752. IT and engineering data stores 754 and 756 of user profile store 752 communicates a post office protocol (POP) synch signal to the user profile module 722 in step 2026. In step 2028, the playlist data is communicated to the user device 710 that requested the data. The data may then be displayed on a display associated with the user device.

Referring now to FIG. 21, a first playlist 2110 and a second playlist 2112 may be combined to form a combined playlist 2114. The playlist 2114 is ultimately communicated to the mobile device. In a user's home system, more than one playlist may be generated when more than one digital video recorder or server is present in the system. When a request for a playlist is generated, playlists from multiple digital video recorders within the home network of the user may be communicated to the head end. The head end may communicate the combined playlist 2114 to a requesting device such as a mobile device or tablet computer.

Referring now to FIG. 22, in some instances the data may not be communicated through the head end. In this example, a mobile device may be used for communicating the user settings to another user device. In step 2210, the user settings are associated with a first user receiving device. The user settings set forth below may correspond to at least some of the profile settings data described above as well as at least some of the content use data. The user settings, for example, may include playlists, favorite channel data, subscription data, and position data such as a pause or last played position. In step 2212, the user settings are communicated to a mobile device from the first user receiving device. The mobile device may be one of the types of devices set forth above including a tablet computer, a laptop computer, a mobile phone or the like. In addition, the mobile device may be a remote control device such as the remote control device illustrated in FIGS. 4A and 4B above. The user settings may be communicated to the mobile device using various types of interfaces, including a near field communication interface, a WiFi interface, a Bluetooth interface, a USB port interface or the like. The connection made between the mobile device and the first user receiving device may be wired or wireless.

In step 2214, the user settings are stored within the mobile device.

In step 2216, the user settings are communicated from the mobile device to a second user receiving device. The second user receiving device may be another device not within or within the users account. The second user receiving device may, for example, be at a friend's house or a hotel. In step 2216, when the mobile device transfers the content to the second user device the same types of networks and connections mentioned in step 2212 may be used.

In step 2218, the second user receiving device is operated with the user settings transferred from the mobile device. In step 2220, when the user operates the second user receiving device with the user settings, an optional step may be performed. That is, when the user operates the second user receiving device with the user settings, the user settings may be updated. Step 2220 communicates the revised user settings to the mobile device. The mobile device may then transfer the revised user settings to the first user receiving device in step 2222.

Of course, this process may take place for only a limited time. That is, the second user receiving device may only use the transferred user settings for a particular time period. In step 2224, it is determined whether the time has expired. If the time has not expired, has not expired, step 2218 continues to operate the second user device with the user settings. In step 2226, when the time has expired, step 2226 removes the transferred user settings from the second user receiving device and operates the second user receiving device with the user settings present prior to the transfer of the user settings from the mobile device.

Referring now to FIG. 23, a method for communicating user settings from one user receiving device to another receiving device through a head end is set forth. In this example, the second user device may not have a network connection but merely a satellite connection. Again, the user settings may be those described above in FIG. 22. In step 2310 a user receiving device identifier is entered into the mobile device. The user receiving device identifier is for the user receiving device for which the user settings are about to be changed. This may take place in many ways including scanning a barcode or QR code on the side of the user receiving device to obtain an image of the code within the mobile device. Such codes may be placed on a sticker. A serial number or other alphanumeric number may also be manually entered into the mobile device. The QR code or barcode may be scanned using the camera feature of the mobile device to obtain an image. The user receiving device may also generate a video signal on a predetermined channel or at a predetermined time. The video signal may include an identifier such as the QR code or barcode. Thus, the camera may be used to obtain the identifier of the user receiving device from the video image of the code. In step 2312, the user receiving device identifier is communicated from the mobile device to a head end or other server. Of course, a user identifier associated with a user account may also be communicated with the user device identifier. These actions may be performed after logging into an application within the user device. Thus, the user identifier may already be identified or known at the user device when the user receiving device identifier is communicated to the head end. In this example, the user settings associated with a user profile may be determined at the head end in step 2314. In step 2316, the user settings are communicated to the user receiving device. This may be performed using a conditional access packet communicated from the head end through the satellite and to the user receiving device. In step 2318, the user receiving device is operated with the user settings communicated thereto. As in FIG. 22, steps 2318 may be performed for a limited time. In step 2320 it is determined whether the time has expired. If the time has not expired for the user settings, step 2318 is continued to be performed. In step 2320 if the time has expired, step 2322 removes the user settings from the user receiving device and operates the user receiving device with the original user or default settings.

Referring now to FIG. 24, another method of using personalization data at a user receiving device is set forth. The following example is cumulative in some respects to that set forth above but uses the set top box as a specific example. Other user receiving devices may be used. In step 2410 the user logs into a set top box or other user receiving device. The user may identify an account with a password, an account number or other types of identifiers. It should be noted that logging into a set top box may also take place using various other means including a magnetic card or a portable electronic device that carries unique identifying data. In step 2412, the set top box generates a query signal and communicates the query signal to a server. In step 2414, the server received the query. Two possible courses of action may take place after step 2414. Step 2416 sends personalization data such as user settings to the set top box in step 2426. In step 2418, the set top box receives the personalization data such as the user settings.

Referring back to step 2414, step 2420 may broadcast personalization data such as user settings to the set top box. In step 2422, the broadcasted personalization data is stored within the set top box. In step 2422, the personalization data is used to operate the set top box. The favorites channels, ratings limits, spending limits, to-do lists, playlists and lists of authorized channels may all be used in step 2422.

Referring now to FIG. 25, when the set top box is used, some of the personalization settings such as user settings may be changed. In step 2510, the user logs into a set top box with an identifier in the same way described above in step 2410. In step 2512, the user changes some of the user settings to form revised user settings data. In step 2514, the set top box communicates a data signal corresponding to the customizations to a server as revised user settings data. The revised settings data may include all of the personalization data including the changed user settings or may include only the changed settings. In step 2516, the revised user settings data is received at the server. In step 2518, the revised user settings data is associated with the user. It should be noted that the user may send a user identifier or profile identifier along with the customization data. The user identifier may also be inherent in the system since the user initially logs into the system. Therefore a customer identifier or other user identifier may be associated with the log on.

Referring now to FIG. 26, a method for providing customizations for a non-networked set top box. In this example, a mobile device is used for sending log in information to the set top box directly. The log-in information is communicated from the set top box in step 2610. The log-in data is received at the set top box in step 2612. The set top box may also provide a challenge in step 2614, which is received in the mobile device in step 2616. This log-in and challenge process may take place using various technologies, including but not limited to Bluetooth, near field communication, WiFi, a direct wired connection or through another type of wireless connection.

In step 2618, a response signal is generated at the user mobile device and communicated to the set top box. In step 2620, the set top acknowledges the log in signal in step 2622 by generating an acknowledgement signal. The mobile device prepares the customized or revised content use data in step 2624 and sends the customized or revised data in step 2626 to the set top box. In step 2628, the customization data such as user setting is received in the set top box. In step 2630 the customization data such as the user settings are used in the operation of the set top box.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    associating an identifier with a first user receiving device;
    a mobile user device obtaining the identifier associated with the first user receiving device;
    communicating the identifier associated with the first user receiving device from the mobile user device to a second user receiving device;
    identifying first user profile settings comprising parental controls and a viewing history with pause and resume points associated with the first user receiving device based on the identifier;
    communicating, from the first user receiving device to the second user receiving device, the first user profile settings and the viewing history with pause and resume points;
    storing the first user profile settings in the second user receiving device; and
    operating the second user receiving device in response to the first user profile settings and first content use data.

2. The method as recited in claim 1 wherein the first user profile settings comprise at least one of purchase restriction data, on-demand access, a list of devices able to access the first user profile, and bill payment data.

3. The method as recited in claim 1 wherein communicating the identifier from the mobile user device to the second user receiving device comprises communicating the identifier from a remote control to the second user receiving device.

4. The method as recited in claim 1 wherein the content use data comprises at least one of playlist data, playback lists, and favorite channel lists.

5. The method as recited in claim 1 further comprising revising the first content use data to form revised content use data in the second user receiving device, and wherein after operating, communicating the revised content use data from the second user receiving device to the first user receiving device and storing the revised content use data in the first user receiving device, and, thereafter, operating the first user receiving device with the revised content use data.

6. The method as recited in claim 5 wherein communicating the revised content use data comprises communicating the revised content use data to the second user receiving device using the mobile user device.

7. The method as described in claim 1 wherein communicating the first user profile settings and first content use data from the first user receiving device to the second user receiving device comprises communicating the first user profile settings and content use data from the first user receiving device to the mobile user device, storing the first user profile settings and first content use data on the mobile user device, and communicating the first user profile settings and first content use data from the mobile user device to the second user receiving device.

8. A method comprising:
associating an identifier with a first user receiving device;
a mobile user device obtaining the identifier associated with the first user receiving device;
communicating the identifier associated with the first user receiving device from the mobile user device to a second user receiving device;
identifying first user profile settings and first content use data associated with the first user receiving device based on the identifier;
communicating, from the first user receiving device to the second user receiving device, the first user profile settings and the first content use data;
storing the first user profile settings and first content use data in the second user receiving device;
operating the second user receiving device in response to the first user profile settings and first content use data;
revising the first user profile settings in the second receiving device to form revised user profile settings; and
wherein after operating, communicating the revised user profile settings from the second user receiving device to the first user receiving device and storing the revised user profile settings in the first user receiving device; and
thereafter, operating the first user receiving device with the revised user profile settings.

9. The method as recited in claim 8 wherein communicating the revised user settings comprises communicating the revised user settings to the second user receiving device through the mobile user device.

10. A system comprising:
a first user receiving device having an identifier associated therewith, first user profile settings comprising parental controls, and first content use data associated therewith, and communicating the first user profile settings and the viewing history with pause and resume points;
a mobile user device obtaining the identifier and communicating the identifier associated with the first user receiving device to a second user receiving device; and
the second user receiving device receiving and storing, from the first user receiving device, the first user profile settings and viewing history with pause and resume points associated with the first user receiving device, and operating with the first user profile settings and viewing history with pause and resume points.

11. The system as recited in claim 10 wherein the first user profile settings comprise at least one of purchase restriction data, on-demand access, devices able to access the first user profile, and bill payment data.

12. The system as recited in claim 10 wherein the mobile user device comprises a remote control.

13. The system as recited in claim 10 wherein the first content use data comprises at least one of playlist data, playback lists, and favorite channels data.

14. The system as recited in claim 10 wherein the second user receiving device revises the first content use data to form revised content use data and wherein the second user receiving device communicates the revised content use data to the first user receiving device and wherein the first user receiving device stores the revised content use data therein, and operates with the revised content use data.

15. The system as described in claim 10 wherein the mobile user device receives the first user profile settings and the first content use data from the first user receiving device, the mobile user device stores the first user profile settings and first content use data, and the mobile user device communicates the first user profile settings and first content use data to the second user receiving device.

16. A system comprising:
a first user receiving device having an identifier associated therewith, first user profile settings, and first content use data associated therewith, and communicating the first user profile settings and the first content use data;
a mobile user device obtaining the identifier and communicating the identifier associated with the first user receiving device to a second user receiving device; and
the second user receiving device receiving and storing, from the first user receiving device, the first user profile settings and first content use data associated with the first user receiving device, and operating with the first user profile settings and the first content use data;
wherein the second user receiving device revises the first user profile settings to form revised user profile settings and communicates the revised user profile settings to the first user receiving device; and
wherein the first user receiving device stores the revised user profile settings therein, and operates with the revised user profile settings.

* * * * *